United States Patent
Martin et al.

(10) Patent No.: US 9,032,501 B1
(45) Date of Patent: May 12, 2015

(54) CRYPTOGRAPHIC PROTOCOL FOR PORTABLE DEVICES

(71) Applicant: Bionym Inc., Toronto (CA)

(72) Inventors: Karl Martin, Toronto (CA); Evgene Vahlis, Mississauga (CA)

(73) Assignee: Bionym Inc., Toronto (CA)

( * ) Notice: Subject to any disclaimer, the term of this patent is extended or adjusted under 35 U.S.C. 154(b) by 0 days.

(21) Appl. No.: 14/461,881

(22) Filed: Aug. 18, 2014

(51) Int. Cl.
| | |
|---|---|
| G06F 21/00 | (2013.01) |
| H04L 9/32 | (2006.01) |
| H04W 12/06 | (2009.01) |
| H04L 29/06 | (2006.01) |

(52) U.S. Cl.
CPC ............. *H04L 9/3213* (2013.01); *H04W 12/06* (2013.01); *H04L 63/08* (2013.01); *H04L 63/061* (2013.01)

(58) Field of Classification Search
USPC .................................... 726/10; 380/44; 705/3
See application file for complete search history.

(56) References Cited

U.S. PATENT DOCUMENTS

| | | | |
|---|---|---|---|
| 6,041,410 | A | 3/2000 | Hsu et al. |
| 6,580,356 | B1 | 6/2003 | Alt et al. |
| 6,799,726 | B2 | 10/2004 | Stockhammer |
| 7,023,320 | B2 | 4/2006 | Dvorak |
| 7,095,707 | B2 * | 8/2006 | Rakib et al. ................... 370/204 |
| 7,378,939 | B2 | 5/2008 | Sengupta et al. |
| 7,780,080 | B2 | 8/2010 | Owen et al. |
| 7,814,332 | B2 | 10/2010 | Beenau et al. |
| 8,352,730 | B2 | 1/2013 | Giobbi |
| 8,371,501 | B1 | 2/2013 | Hopkins |
| 8,412,949 | B2 * | 4/2013 | Giobbi et al. ................. 713/186 |
| 8,869,263 | B2 | 10/2014 | Pasquero et al. |
| 2002/0140542 | A1 | 10/2002 | Prokoski et al. |
| 2003/0046228 | A1 | 3/2003 | Berney |
| 2005/0068171 | A1 | 3/2005 | Kelliher et al. |
| 2007/0177770 | A1 | 8/2007 | Derchak et al. |
| 2008/0216171 | A1 | 9/2008 | Sano et al. |

(Continued)

FOREIGN PATENT DOCUMENTS

| | | |
|---|---|---|
| WO | 2005117527 A3 | 12/2005 |
| WO | 2007128975 | 11/2007 |
| WO | 2012151680 | 11/2012 |

OTHER PUBLICATIONS

International Search Report for Application No. PCT/CA2012/000448 dated Aug. 23, 2012.

(Continued)

*Primary Examiner* — Jason Lee
(74) *Attorney, Agent, or Firm* — John W. Branch; Lowe Graham Jones PLLC

(57) ABSTRACT

Embodiments are directed towards communicating using a mobile device that performs actions including. A mobile device may be provisioned with an access point such that a provisioning key and a provisioning token for each of the provisioned access points may be stored on the mobile device. The mobile device may be determined to be in the presence of a provisioned access point based on the provisioning key and an advertising nonce. The advertising nonce may be encrypted with the provisioning key. A communication channel between the mobile device and the access point may be established based on a session nonce, the advertising nonce, and the provisioning key. A session key may be generated based in part on the advertising nonce and a message counter. And, encrypted message packets that include a message and a message authentication tag may be communicated to the access point.

30 Claims, 14 Drawing Sheets

(56) References Cited

U.S. PATENT DOCUMENTS

| | | | |
|---|---|---|---|
| 2009/0146947 | A1 | 6/2009 | Ng |
| 2009/0199264 | A1 | 8/2009 | Lang |
| 2010/0030695 | A1 | 2/2010 | Chen et al. |
| 2012/0004523 | A1 | 1/2012 | Richter et al. |
| 2012/0316406 | A1 | 12/2012 | Rahman et al. |
| 2012/0317024 | A1 | 12/2012 | Rahman et al. |
| 2013/0159021 | A1* | 6/2013 | Felsher .............................. 705/3 |
| 2013/0322622 | A1* | 12/2013 | Bailey et al. .................... 380/44 |
| 2014/0188770 | A1 | 7/2014 | Agrafioti et al. |

OTHER PUBLICATIONS

Wang et al., "Analysis of Human Electrocardiogram for Biometric Recognition", EURASIP Journal on Advances in Signal Processing, vol. 2008, Article 10 148658, pp. 1-11, Jan. 31, 2008.

Klosterman et al. "Secure Continuous Biometric-Enhanced Authentication", CMU-CS-00-134, School of Computer Science, Carnegie Mellon University, pp. 1-22, May 31, 2000.

Ortega-Garcia, et al., "MCYT Baseline Corpus: A Bimodal Biometric Database", IEE Proc.-Vis. Image Signal Process, vol. 150, No. 6, pp. 395-401. Dec. 31, 2003.

Pasini et al., "Sas-based Authenticated Key Agreement," In Public Key Cryptography—PKC 2006, pp. 395-409, Springer, 2006.

Noble et al., "The Case for Transient Authentication," Department of Electrical Engineering and Computer Science University of Michigan, Ann Arbor, MI, 6 pages.

Ojala et al., "Wearable Authentication Device for Transparent Login in Nomadic Applications Environment," 2008 International Conference on Signals, Circuits and Systems, 6 pages.

Al-Muhtadi et al., "Wearable Security Services," Department of Computer Science, 6 pages.

Agrafioti et al., "Medical Biometrics in Mobile Health Monitoring," Security and Communication Networks, 2011, 4, pp. 525-539.

Hoekema et al., "Geometrical Aspects of the Interindividual Variability of Multilead ECG Recordings," IEEE Transactions on Biometrical Engineering, vol. 48, No. 5, May 2001, pp. 551-559.

Draper et al., "The Corrected Orthogonal Electrocardiogram and Vectorcardiogram in 510 Normal Men (Frank Lead System)" Circulation, vol. 30, 1964, pp. 853-864.

Biel et al., "ECG Analsis: A New Approach in Human Identification," IEEE Transactions on Instrumentation and Measurement, vol. 50, No. 3, Jun. 2001, pp. 808-812.

Wubbeler et al., "Verification of Humans Using the Electrocardiogram," Pattern Recognition Letter, vol. 26, No. 10, 2007, pp. 1172-1175.

Odinaka et al., "ECG Biometrics: A Robust Short-time Frequency Analysis," Proceedings of IEEE International Workshop on Information Forensics and Security, Dec. 2010, pp. 1-6.

Li et al., "Robust ECG Biometrics by Fusing Temporal and Cepstral Information," Proceedings of 20th International Conference on Pattern Recognition, Aug. 2010, pp. 1326-1329.

Agrafioti et al., "ECG Based Recognition Using Second Order Statistics," Communication Networks and Services Research Conference, May 2008, pp. 82-87.

Agrafioti et al., "Signal Validation For Cardiac Biometrics," IEEE 35th International Conference on Acoustics, Speech, and Signal Processing, 2010, pp. 1734-1737.

Zhao et al., "Fingerprint Image Synthesis Based on Statistical Feature Models," IEEE 5th International Conference on Biometrics: Theory, Applications, and Systems, 2012, pp. 23-30.

Agrafioti et al., "Medical Biometrics: The Perils of Ignoring Time Dependency," Proceedings of 3rd International Conference on Biometrics: Theory, Applications, and Systems, 2009, pp. 1-6.

Odinaka et al., "ECG Biometric Recognition: A Comparative Analysis" IEEE Transactions on Information Forensics and Security, vol. 7, No. 6, Dec. 2012, pp. 1812-1824.

Bellare et al., "Forward-Security in Private-Key Cryptography," Department of Computer Science and Engineering, 2003, pp. 1-24.

International Search Report and Written Opinion for International Application No. PCT/IB2014/001383 mailed on Dec. 8, 2014, 11 pages.

Noble et al., "The Case for Transient Authentication," Department of Electrical Engineering and Computer Science, University of Michigan, Ann Arbor, MI, Sep. 2002, 6 pages.

Al-Muhtadi et al., "Wearable Security Services," Department of Computer Science, 2001, 6 pages.

Agrafioti et al., "Heart Biometrics: Theory, Methods, and Applications," Intech, www.intechopen.com, Jun. 2011, 19 pages.

* cited by examiner

CRYPTOGRAPHIC PROTOCOL FOR PORTABLE DEVICES

TECHNICAL FIELD

This invention relates generally to cryptography protocols, and more particularly, but not exclusively, to protocols for authentication and communication tor mobile devices.

BACKGROUND

As portable devices continue to proliferate among users, manufacturers and service providers are constantly devising new and useful applications for use with a user's portable devices. Further, in some cases, the portable device may serve as a mechanism for identifying the users. For example, in some cases users may employ applications on their smart phones for interacting with point-of-sale stations, where charges for goods and services may be billed directly to then phone service. In other cases, portable devices may be employed to carry and display user credentials such as event tickets, coupons, boarding passes, or the like. However, in these applications there is another user that helps verify or authenticate that the user present the portable device to purchase items or verify previous purchases is the correct person. Or, in some cases, if the harm that may be caused by mistaken identity relatively negligible, it may be taken on faith that the portable device is under the control of legitimately owner. In other words, the access points may be unable to verify that the user of the portable device is the correct person—the person who is the legitimate owner of the portable device. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the present innovations, reference will be made to the following Description of the Various Embodiments, which is to be read in association with the accompanying drawings, wherein.

DESCRIPTION OF THE VARIOUS EMBODIMENTS

Figure 1:
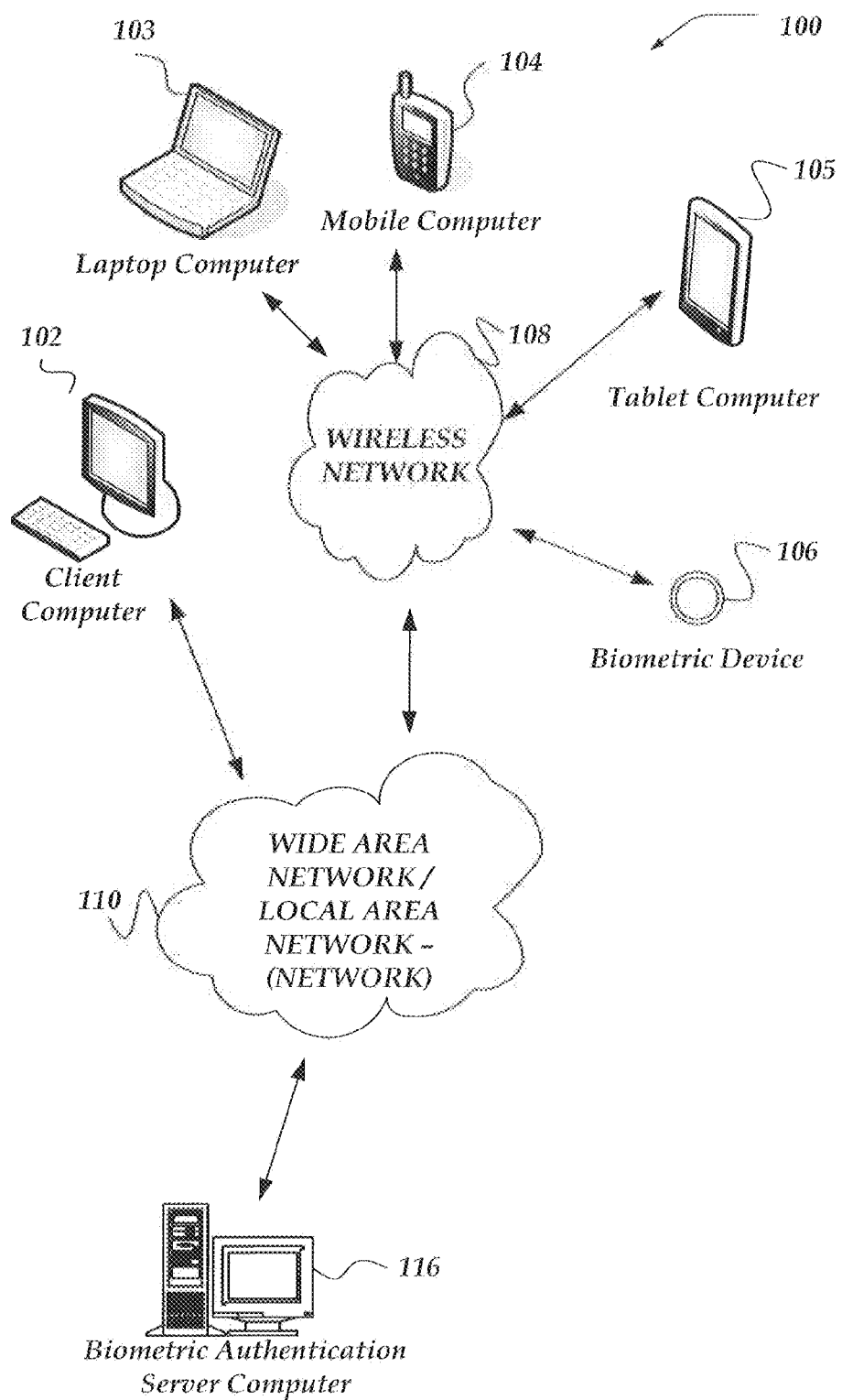
FIG. 1 illustrates a system environment in which various embodiments may be implemented.

The present innovations now will be described more fully hereinafter with reference to the accompanying drawings, which form a part hereof, and which show, by way of illustration, specific embodiments by which the innovations may be practiced. These innovations may, however, be embodied in many different forms and should not be construed as limited to the embodiments set forth herein: rather, these embodiments are provided so that this disclosure will be thorough and complete, and will fully convey the various embodiments to at least those skilled in the art. Among other things, the present innovations may be embodied as methods, computers, or devices. Accordingly, the embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "encryption" as used herein is understood to refers to actions that change (information) from one form to another especially to hide its meaning. Further, in some embodiments, encryption as used herein may include employing pseudorandom transformations that produce pseudorandom outputs in the sense that a cipher text may be distinguishable from a completely random sequence of bits of the same length without revealing anything about the plaintext. For example, consider adding one or more zeros at the end of every encryption output. In at least one of the various embodiments, encryption may include applying a pseudorandom function information, where the key of the pseudorandom function may be stored locally on a mobile device.

The term "pseudorandom function" as used herein refers to a function F(*, *) where the first input is a key (that must be random), and the second input can be any value. At least one of its properties is that the output of F(K, x) on any x is indistinguishable from a random value to anyone who does not know K. AES is an example of a conjectured pseudorandom function.

The terms "biometric," "biometric data," or "biometric signal" as used herein are understood to mean any signal that can be obtained from a user that can uniquely identify the user. Non-limiting examples of biometric signals are gait, heart rate, galvanic skin response, temperature, fingerprint, voice or voiceprint, body electrical characteristic, body thermal characteristic, iris pattern, vein pattern, eye vein pattern, facial or other anatomical structure, electrocardiogram, photoplethysmogram, electromyogram, electroencephalogram, transient otoacoustic emissions, phonocardiogram, DNA, one or more chemical markers, one or more biochemical markers., skin-color variation or discolouration, perspiration, or a combination thereof. A unique identity of a user can also be obtained by observing patterns or combinations of more one biometric characteristic. For example a person may have a unique heart rate at a particular temperature and with a particular amount of sweat. In this way, two or more biometric observations can be combined or fused to obtain a multi-modal unique biometric profile. This is especially useful in situations wherein one particular biometric is not sufficient as a standalone identifier. In one example, perspiration and gait can be combined or fused to provide a unique biometric profile for a user. Information from sources that are standalone identifiers can also be combined in order to increase accuracy and/or security. In another example, a multi-modal biometric system may fuse fingerprints with iris and face characteristics.

The term "access point" as used herein refers to any logical or physical gateway, device, or application that requires authorization, such as for security or personalization purposes, and is otherwise locked or inaccessible to the user. Some non-limiting examples of physical access points are electronically locked doors, parking transceivers, smart environment technologies, vehicle doors and transit systems. Some non-limiting examples of logical access points are password, PIN or passcode protected electronic devices or accounts, proof of payment systems, point of sale stations, automated bank teller machines, library checkout systems, and hotel and airport check-in stations. Further, access points may be considered a generic term for applications, computers, terminals, device, or the like, that are enable communicate using the protocols described herein.

The term "authorized authentication device" as used herein refers to access points that may be arranged to include specialized applications for enrolling/registering a mobile device with a user. Authorized authentication devices (AADs) may be arranged to store keys, encryption biometric user profiles, or the like.

The term "provisioning key" as used herein refers to a cryptographic key that corresponds to a mobile device and an access point that arc provisioned/paired with each other. The provision key for each provisioned access point is stored on the mobile device.

The term "provisioning token" as used herein refers to a cryptographic random number that is used during provisioning actions conducted between a mobile device and an access point. The provisioning token may be stored on the mobile device and the access point after provisioning is complete.

The term "session key" as used herein refers to a cryptographic key that is generated for encrypting communication between a mobile device and a provisioned/paired access point.

The term "session nonce" as used herein refers to a cryptographic random number that is used during communication between a mobile device and a provisioned/paired access point.

The term "advertising nonce" as used herein refers to a cryptographic random number that is used during presence detection between a mobile device and a provisioned/paired access point. Advertising nonces are generated on the mobile device and broadcasted to access points.

The following briefly describes: the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards communicating rising a mobile device. In at least one of the various embodiments, a provisioning key and a provisioning token that corresponds to at least one remote access point may be communicated for provisioning the at least one remote access point for communication with the mobile device such that each provisioning key and each provisioning token that corresponds to each provisioned remote access point are locally stored by the mobile device and each provisioned access point.

In at least one of the various embodiments, an advertising nonce and an encrypted advertising nonce may be communicated to a provisioned remote access point such that the provisioned remote access point maybe arranged to employ its locally stored provisioning key to decrypt the encrypted advertising nonce and compare the decrypted advertising nonce to the advertising nonce.

In at least one of the various embodiments, if a provisioned access point communicates that the comparison of the advertising nonce and the decrypted advertising nonce match or are otherwise equivalent additional action may be performed including: In at least one of the various embodiments, establishing a communication channel with the provisioned remote access point based on the advertising nonce and a session nonce generated by the provisioned remote access point and its corresponding provisioning key. In at least one of the various embodiments, generating a session key for communicating with the provisioned remote access point based in part on the advertising nonce and a message counter such that the provisioned remote access point generates a remote message counter. In at least one of the various embodiments, encrypting one or more message packets that include a message and a message authentication tag. And, in at least one of the various embodiments, communicating the encrypted Message packets to the provisioned remote access point.

In at least one of the various embodiments, provisioning one or more remote access points may further include exchanging a temporary key with the remote access point. In at least one of the various embodiments, generating the provisioning token based on a pseudorandom number. And, in at least one of the various embodiments, generating the provisioning key based on encrypting the provisioning token using a secret key that may be stored on the mobile devices such that the provisioning token may be communicated to the remote access point for verification.

In at least one of the various embodiments, communicating the advertising nonce and the encrypted advertising nonce for the provisioned remote access point may further include generating a separate advertising nonce that may be based on a pseudorandom number. And, in at least one of the various embodiments, encrypting the separate advertising nonce for the provisioned remote access point using its provisioning key.

In at least one of the various embodiments, establishing the communication channel with the provisioned remote access point, may include additional actions. In at least one of the various embodiments, generating the session nonce may be based on a pseudorandom number. In at least one of the various embodiments, generating a modified advertising nonce may be based on flipping one or more predefined bits of the advertising nonce such that the value of the modified advertising nonce may be different than the advertising nonce and other advertising nonces. In at least one of the various embodiments, generating a test value that may be based on encrypting the modified advertising nonce using the provisioning key. And, in of least one of the various embodiments, communicating a 3-tuple that includes the session nonce, the test value, and the provisioning token to the access point.

In at least one of the various embodiments, generating the session key may further include a modified advertising nonce that may be generated based on flipping one or more predefined bits of the advertising nonce such that the value of the modified advertising nonce may be different than the advertising nonce and any other the advertising nonce. And, in at least one of the various embodiments, the session key may be encrypted based on the modified advertising nonce and the provisioning key.

In at least one of the various embodiments, encrypting message packets may further include encrypting the message counter based on the session key. In at least one of the various embodiments, the message may be encrypted based on the encrypted message counter. In at least one of the various embodiments, the message tag may be encrypted by encrypting a portion of the encrypted message using the session key. And, in at least one of the various embodiments, a tuple may be generated that includes the encrypted message and the message tag.

In at least one of the various embodiments, biometric sensor tint a may be captured using the mobile device. In at least one of the various embodiments, a modified advertising nonce may be generated based on one or more predefined bits of the advertising nonce such that the value of the modified advertising nonce may be different than the advertising nonce and other advertising nonces. In at least one of the various embodiments, another session key may be generated by encrypting the modified advertising nonce using the provisioning key. And, in at least one of the various embodiments, the captured biometric sensor data may be encrypted using the other session key and communicating the encrypted biometric sensor data to the provisioned remote access point.

In at least one of the various embodiments, random number seeds required by the protocols used by the mobile device may be generated based in part on entropy derived from sampling signals from one or more sensors on the mobile device In at least one of the various embodiments, random number seeds required by the protocols used by the mobile device may be generated based in part on entropy derived from sampling signals from one or more sensors on the mobile device.

Illustrative Operating Environment

FIG. 1 shows components of one embodiment of an environment in which embodiments of the invention may be practiced. Not all of the components may be required to practice the invention, and variations in the arrangement and type of the components maybe made without departing from the spirit or scope of the invention. As shown, system 100 of FIG. 1 includes local area networks (LANs)/wide area networks (WANs)—(network) 110, wireless network 108, client computers 102-105, biometric device 106, biometric authentication server computer 116, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, access point, authorized authentication device (AAD), or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, smart phones, biometric devices, portable devices, or the like. However, portable computers are not so limited and may also include other portable computers such as cellular telephones, display pagers, radio frequency (RF) devices, infrared (IR) devices. Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), Hypertext Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer and/or an access points. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, biometric authentication server computer 116, or other computers.

Client computers 102-105 may further be configured to include a client application that enables an end-user to log into an end-user account that may be managed by another computer, such as biometric authentication server computer 116, or the like. Such an end-user account, in one non-limiting example, may be configured to enable the end-user to manage one or more online activities, including in one non-limiting example, project management, system administration, configuration management, search activities, social networking activities, browse various websites, communicate with other users, or the like.

Biometric device 106 can be any device that can be worn by a user and is capable of obtaining a biometric signal. Non-limiting examples of suitable wearable biometric device are a wristband, wristwatch, bracelet, necklace, ring, belt, glasses, clothing, hat, headband or earring(s), or any other wearable item that is capable of obtaining a biometric signal. The biometric device 106 can also be incorporated into clothing. In another embodiment, the biometric device 106 may comprise more than one biometric sensor. Biometric device 106 may be arranged to communicate with one or more of client computer 102-105 over a network, such as wireless network 108. Further, biometric device 106 may be arranged to communicate Wireless network 108 is configured to couple client computers 103-105 and biometric device 106 with network 110. Wireless network 108 may include any of a variety of wireless sub-networks that may further overlay stand-alone ad-hoc networks, and the like, to provide an infrastructure-oriented connection for client computers 103-105 and/or biometric device 106. Such sub networks may include mesh networks. Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105, and biometric device 106 with various degrees of mobility. In one non-limiting example, wireless network 108 may enable a radio connection through a radio network access such as Global System tor Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105, biometric device 106, and another computer, network, a cloud-based network, a cloud instance, or the like.

Network 110 is configured to couple network computers with other computers, including, biometric authentication service computer 116, client computers 102-105, biometric device 106 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of biometric authentication server computer 116 is described in more detail below in conjunction with FIG. 3. Briefly, however, biometric authentication server computer 116 includes virtually any network computer capable of performing actions for storing, authenticating, processing of biometric information, users, access points, or the like.

Although FIG. 1 illustrates biometric authentication server computer 116 as a single computer, the innovations and/or embodiments are not so limited. For example, one or more functions of biometric authentication server computer 116 may be distributed across one or more distinct network computers. Moreover, biometric authentication server computer 116 is not limited to a particular configuration such as the one shown in FIG. 3. Thus, in one embodiment biometric authentication server computer 116 may be implemented using a plurality of network computers and/or client computer. In other embodiments, development computer may operate as a plurality of network computers within a cluster architecture, a peer-to-peer architecture, or the like. Further, in at least one of the various embodiments, biometric authentication server computer 116 may be implemented using one or more cloud instances in one or more cloud networks.

Illustrative Client Computer

Figure 2:
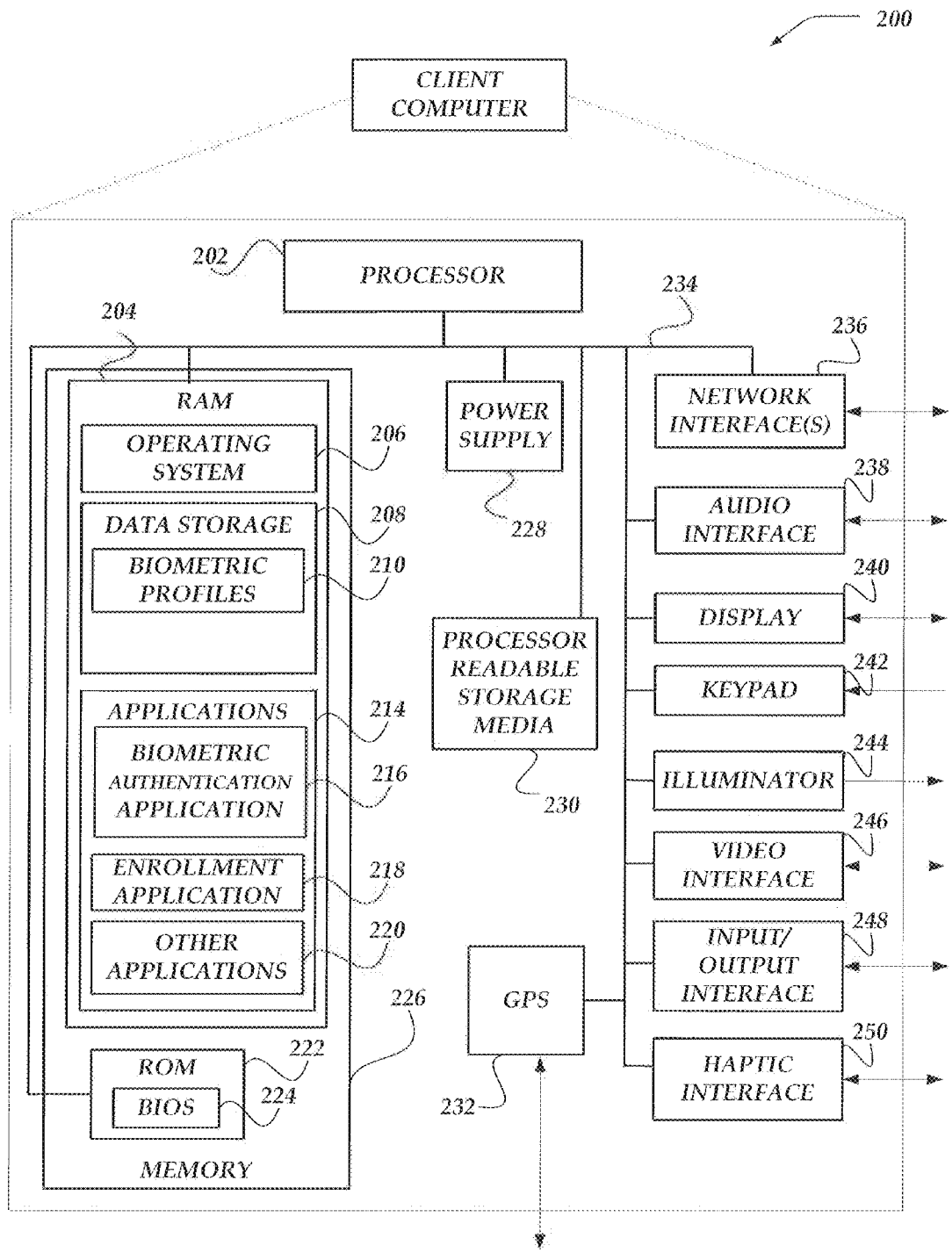
FIG. 2 shows a schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, bin not limited to, GSM, CDMA. TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, if may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interlace 246 is arranged to capture video images, such as a still photo, a video segment, an infrared video, or the like. For example, video interface 246 may be coupled to a digital video camera, a web-camera, or the like. Video interlace 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared. Bluetooth™, or the like.

Haptic interface 250 is arranged to provide tactile feedback to a user of die client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200, and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Rend-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or Linux™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also he employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200. Further, at least a portion of data storage 208 may be used to store biometric profile information 210 for one or more users and/or one or more biometric devices.

Processor readable storage media 230 may include volatile non-transitive, non-transitory, nonvolatile, removable, and non-removable media implemented in any method or technology for storage of information, such as computer- or processor-readable instructions, data structures, program modules, or other data. Examples of computer readable storage media include RAM, ROM. Electrically Erasable Programmable Read-only Memory (EEPROM), flash memory or other memory technology. Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, a browser 218, and other applications 220. Further, applications 214 may include biometric authentication application 216, enrollment application 218, or the like.

Browser 218 may include virtually any application configured to receive and display graphics, text, multimedia, messages, and the like, employing virtually any web based language. In one embodiment, the browser application is enabled to employ HDML, WML WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as biometric authentication service computer 116 as shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

In at least one of the various embodiments, client computers may be arranged to include one or more additional components such as those described below. See, FIGS. 4A and 4B.

Illustrative Network Computer

Figure 3:
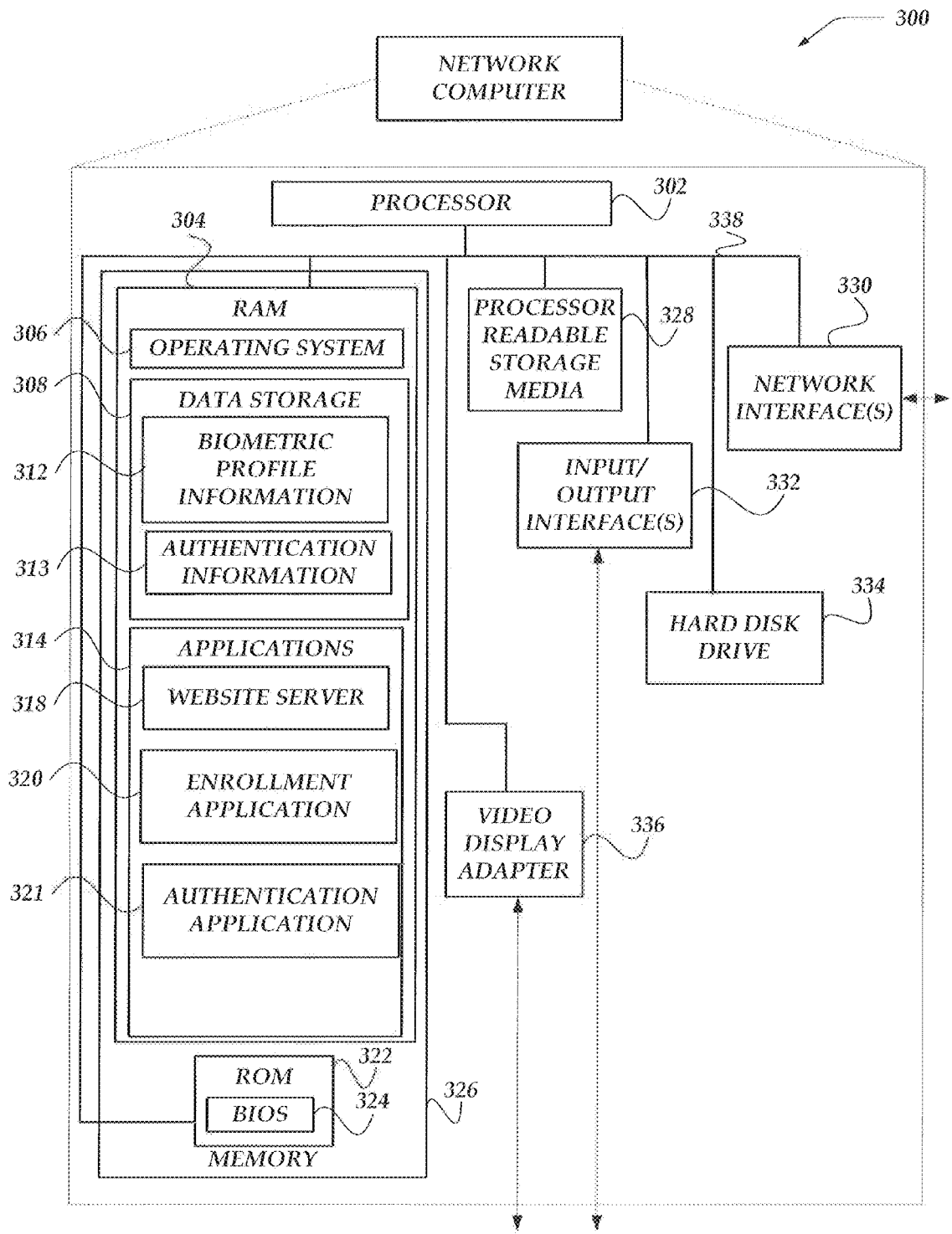
FIG. 3 illustrates a schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example biometric authentication server computer 116, and/or other network computers.

Network computer 300 includes processor 302, processor readable storage media 328, network interlace unit 330, an input/output interlace 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or other communication networks, via network interface unit 330, which is constructed for use with various communication protocols including the TCP/IP protocol Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can he used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, bus not limited to processor readable storage media 328, hard disk drive 334, or oilier computer readable storage medias (not shown) within network computer 300.

Data storage 308 may include a databases text, spreadsheet, folder, tile, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334. or the like.

Data storage 308 may include biometric profile information 312. In at least one of the various embodiments, biometric profile information 312 may include information, such as, one or more files, that include biometric data for one or more users, or the like, used for authentications of wearable biometric devices. Also, in at least one of the various embodiments, data storage 308 may include, authentication information 313 that may include information about users, access points, access control lists, or the like.

Applications 314 may include computer executable instructions, which may be loaded into mass memory and run on operating system 306. Examples of application programs may include transcoders, schedulers, calendars, database programs, word processing programs. Hypertext Transfer Protocol (HTTP) programs, customizable user interlace programs, IPSec applications, encryption programs, security programs, SMS message servers, IM message servers, email servers, account managers, and so forth. Applications 314 may also include, enrollment application 320 for enrolling and/or activating biometric devices. Application mat also include authentication application 321 for authenticating users by employ biometric information, biometric devices, additional conditions, or the like.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Architecture

Figure 4A:
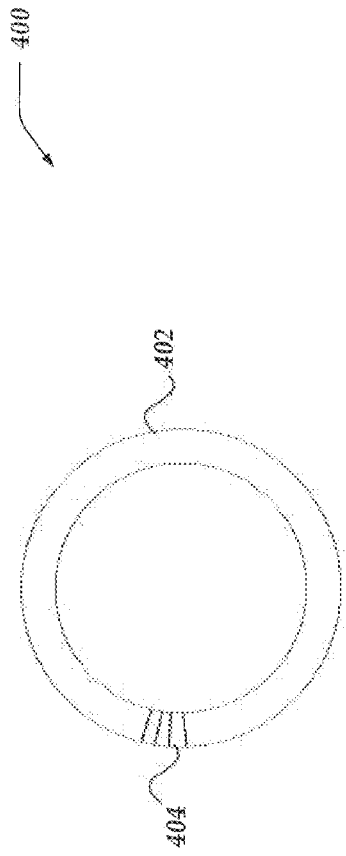
FIGS. 4A and 4B illustrates a logical illustration of a wearable biometric device that is in accordance with at least one of the various embodiments.
Figure 4B:
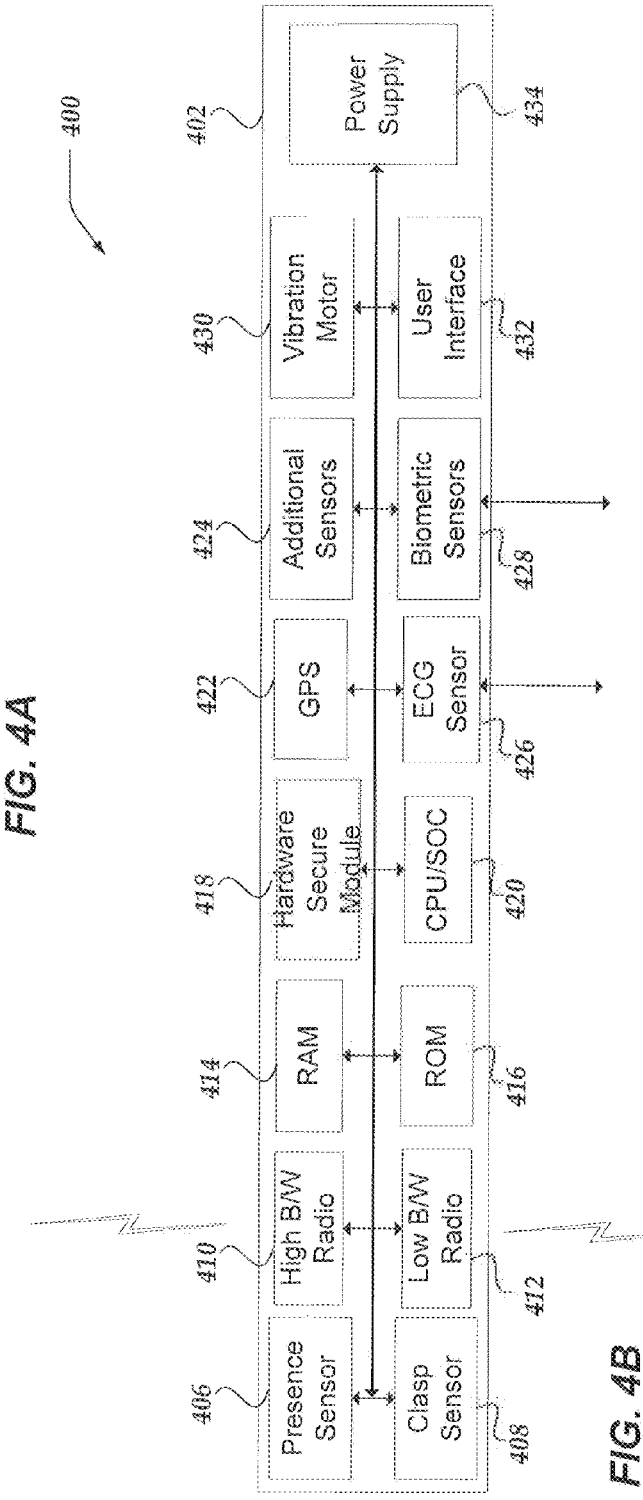

FIGS. 4A and 4B illustrates a logical illustration of a wearable biometric device that is in accordance with at least one of the various embodiments. Biometric device 400 may be an embodiment of mobile computer 200 arranged to include one or more additional sensors and/or components as described below.

FIG. 4A illustrates biometric device 400 that is arranged as a wearable wristband/bracelet. In at least one of the various embodiments, wristband 402 may be arranged to include various hardware components, sensors, and software for capturing biometric signals from its wearer; communication with an access point; authentication of a wearer, or the like, as discussed above. Further, in at least one of the various embodiments, wristband 402 may include an adjustable clasp mechanism, such as, clasp 404. for detecting if a wearable removes wristband 402 from his or her wrist. For example, in at least one of the various embodiments, if a biometric device detects that the clasp is opened, it may automatically de-authenticate itself. In at least one of the various embodiments, resetting and/or de-authenticating biometric device 402 may include erasing it cryptographic state—provisioning keys, session keys, global public keys (for partner cloud services), tokens, advertisement nonces, or the like.

FIG. 4B illustrates a logical view of some of the various components that may comprise a biometric device in accordance with at least one of the various embodiments. In at least one of the various embodiments, wristband 402 may include one or more presence sensors, such as, presence sensor 406, presence sensors may be arranged to determine if a biometric device is in the presence of a wearer, access point, or the like, or combination thereof Also, in at least one of the various embodiments, biometric device 402 may include one or more radios or transceivers, such as, high bandwidth radio 410 and low bandwidth radio 412. These radios may enable a biometric device to communicate with other computers or devices, such as, access points, biometric authentication servers, or the like, or combination thereof.

In at least one of the various embodiments, clasp sensor 408, may be arranged to determine if the clasp, or other securing mechanism, is opened or closes. In at least one of the various embodiments, an opened clasp may indicate that the biometric device may be separated from its authenticated user. Accordingly, for example, the biometric device may be arranged to automatically reset or otherwise de-authenticate itself if clasp sensor 408 indicates that the biometric device is removed from the wearer. Further, removal of the wearable device may be sensed by the biometric device for example, by opening the clasp, cutting the band, or generally severing an electrical conduit such as an electronic continuity detector. One exemplary electronic continuity detector that may be used to detect device removal comprises of a simple circuit within the wearable device that runs around the entire wrist and is broken when the clasp is opened or the band is cut. Other types of device removal detection may be used, for example, including disruption in skin contact detection by way of conductivity, heat flux, galvanic skin response or motion, or periodic or continuous biometric signal detection. Yet other non-limiting examples of device removal detection embodiments include pulse detection, skin temperature detection, ambient temperature detection, blood flow detection, pressure detection, ambient light detection, electromagnetic field detection, respiration detection, heart rate detection, electrocardiogram detection, photoplethysmogram detection, electromyogram detection, electroencephalogram detection, near infra-red detection, skin-color detection, close magnetic contact detection, and mechanical switch detection.

In at least one of the various embodiments, resetting and/or de-authenticating biometric device 402 may include erasing it cryptographic state—provisioning keys, session keys, global public keys (for partner cloud services), tokens, advertisement nonces, or the like.

In at least one of the various embodiments, as discussed above, biometric device 402 may be arranged to communicate with various devices, such as, access points, biometric servers and cloud services, or the like, or combination thereof. In at least one of the various embodiments, high bandwidth radio 410 may include radios for communication using high bandwidth mechanisms such as Wi-Fi, or the like. Low bandwidth radio 412 may represent components tor communicating using low-power, shelter range radio systems such as, Bluetooth, Bluetooth Low Energy, NFC, RFID, or the like, or combination thereof. Further, in at least one of the various embodiments, these radios may be coupled to one or more antennas to facilitate the transmission and reception of wireless signals. Any type of antenna(s) may be used including, for example, a dipole antenna, a patch antenna, a helical antenna, an antenna array, and/or others, including combinations of the above.

In at least one of the various embodiments. RAM 414 may be non-volatile and/or volatile random access memory for storing information for operation of biometric device 402. In at least one of the various embodiments, all or portions of the contents of RAM 414 may be erased if the biometric device is removed of its wearer. Likewise, in at least one of the various embodiments, ROM 416 may contain data and/or instructions for the operation of the biometric device. In at least one of the various embodiments. ROM 416 may be "flasbable," enabling it to be updated with system updates provided by an AAD access point or a biometric server service.

In at least one of the various embodiments, hardware secure module (HSM) 418 may represent one or more hardened tamper resistant microprocessor devices that include memory that is resistant to physical tampering. In at least one of the various embodiments, sensitive information such as cryptographic keys may be stored in secure memory 418. Further, in at least one of the various embodiments. HSM 418 may be arranged to provide facilities for generating truly random numbers, key generation, encryption/decryption functions, cryptographic hashing functions, or the like.

In at least one of the various embodiments, biometric device 402 may be arranged to include CPU or System-on-a-Chip (SOC) for controller the operations of the biometric device. The performance capability go CPU/SOC 420 may vary depending on how much processing biometric device 402 is intended to perform.

In at least one of the various embodiments, GPS transceiver 422 may represent the radios, hardware, and instructions (e.g., software) for receiving geo-location. GPS transceiver 422 may determine the physical coordinates of biometric device 402 on the surface of the Earth. GPS transceiver 422 typically outputs a location as latitude and longitude values. However, GPS transceiver 422 may also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of biometric device 402 on the surface of the Earth. It is understood that under different conditions, GPS transceiver 422 may determine a physical location within millimeters for biometric device 402; and in other eases, the determined physical location may be less precise, such as within a meter or significantly greater distances.

In at least one of the various embodiments, additional sensors 424 represent one or more sensor systems including, additional sensors such as accelerometers, motion sensors, proximity sensors, barometric sensors, pressure sensors, thermometers, microphones, near infrared sensors, light sensors, capacitive sensors, gyroscopes, manometers, cameras, humidity sensors, hall sensors, galvanic skin sensors, photoplethysmogram sensors, electroencephalogram sensors, electromyogram sensors, blood flow sensors, bioimpedance sensors, otoacoustic emission sensors, optical sensors, altimeter sensors, UV light sensors, or the like.

In at least one of the various embodiments, as discussed above, biometric device 402 may be arranged lo include a variety of biometric sensors for detecting, sensing, and/or sampling a variety of biometric signals from the wearer. ECG sensor 426 represents one or more sensors for detecting, sensing, and/or sampling ECG information as described above. Likewise, biometric sensors 428 represent one or more sensors for detecting, sensing, and/or sampling other biometric information as described above.

In at least one of the various embodiments, biometric sensor 402 may he arranged to include a variety of components for interacting with the wearer. Vibration motor 430 may enable the biometric device to vibrate to notify the wearer of various changes in state, or the like (as discussed above). Likewise, user interface 432 may comprise elements that enable a user to provide input to the biometric device or for receiving output from the biometric device as discussed above, including biometric data that may be employed to uniquely identify a user, such as, gait, heart rate, galvanic skin response, temperature, fingerprint, voice or voiceprint, body electrical characteristic, body thermal characteristic, iris pattern, vein pattern, eye vein pattern, facial or other anatomical structure, electrocardiogram, photoplethysmogram, electromyogram, electroencephalogram, transient otoacoustic emissions, phonocardiogram, DNA, one or more chemical markers, one or more biochemical markers, skin-color variation or discolouration, perspiration, or the like. Also, in at least one of the various embodiments, user interface 432 may include a key pad, buttons, LED's microphone (for voice commands), or the like, or combination thereof.

Also, in at least one of the various embodiments, power source 434 may be arranged to provide power of operating biometric device 402. Power source 434 may include various batteries, storage cells, power adapters, chargers, or the like, as well as, power sources such as, photovoltaic, kinetic, or microgenerator, thermal, piezo-electric generator, inductive charging, and wireless power transfer or the like, or combination thereof.

One or ordinary skill in the art will appreciate that biometric device 402 is a non-limiting example or a biometric device that is in accordance at least one of the various embodiments. Even though biometric device 402 represents a wristband wearable biometric device, biometric devices within the scope of these innovations may be arranged in other form factors, such as those discussed above.

Further, in at least one of the various embodiments, some or all of components described in FIG. 4B and/or elsewhere in this paper may be implemented in hardware, including, dedicated (custom) hardware, ASICs, FPGAs, or the like. Likewise, these components or portions thereof may be implemented in whole or in part using software.

For example, in at least one of the various embodiments, a wearable device may be arranged to omit features and components related to biometric sensors, biometric signals, or the like. In such embodiments, the preauthorization and/or authentication of the device may be based on non-biometric security factors. However, in the interest of brevity, the term biometric device is used throughout this description even though some wearable devices may be arranged to omit biometric features for authentication and/or preauthorization.

In at least one of the various embodiments, one or more types of sensitive information may be securely stored on the biometric device and/or the AAD access point. In at least one of the various embodiments, protected data on AAD should only be accessible when a paired biometric device is present.

In at least one of the various embodiments, the cryptographic state of the biometric device may comprise of at least four keys. In at least one of the various embodiments, these keys may include:

1. $K_{prgseed}$—the current pseudorandom generator (PRG) seed. If a cryptographic algorithm executing on the biometric device requires randomness, a PRG will be evaluated using this seed, and the seed will be updated.

2. $K_{ned}$—a master key for generating access point provisioning keys.

3. $K_{aad}$—the AAD provisioning key. Used to encrypt and authenticate communications between a biometric device and an AAD.

4. $K_{api}$—a master key for generating signature private keys and (symetric) secret keys.

In at least one of the various embodiments, the AAD may maintain a secret key $K_{biometric\_device\_state}$ that may be used to encrypt $K_{ned}$ and $K_{api}$. Note, in at least one of the various embodiments, $K_{aad}$ may be stored unencrypted on the biometric device since it is needed to establish a secure channel with the AAD. In at least one of the various embodiments, the see of the PRG, $K_{prgseed}$, is regenerated using true randomness every time the biometric device restarted or is factory-reset.

In at least one of the various embodiments, the biometric user profile that is stored on the AAD may be encrypted separately under two keys The first key may be a key that is generated using the secret key facility of the biometric device. In at least one of the various embodiments, the secret key facility outputs two 16-byte values ($ID_K$, K). The AAD may retain $ID_K$, and use it to retrieve K every time that an unauthenticated biometric device establishes a secure channel. The second key $K_{pw}$ is derived from a password, and may be used as a fallback key. Note, that this key may have lower entropy than K. Io at least one of the various embodiments, $K_{pw}$ may be derived from a password as described in the Password-Based Key Derivation Function 2 (PBKDF2) that is part of RSA Laboratories' Public-Key Cryptography Standard (PKCS).

Sequence Diagrams

FIGS. 5-8 include sequence diagrams that arc useful for clarifying the actions and actors as they participate in the communication protocols. In at least one of the various embodiments, the mobile device referred to in die sequence diagrams may a biometric device such as biometric device 402. Likewise, access points may be computers, applications, mobile devices, or the like, that are enabled to interface with one or more mobile devices in accordance with at least one of the various embodiments.

Figure 5:
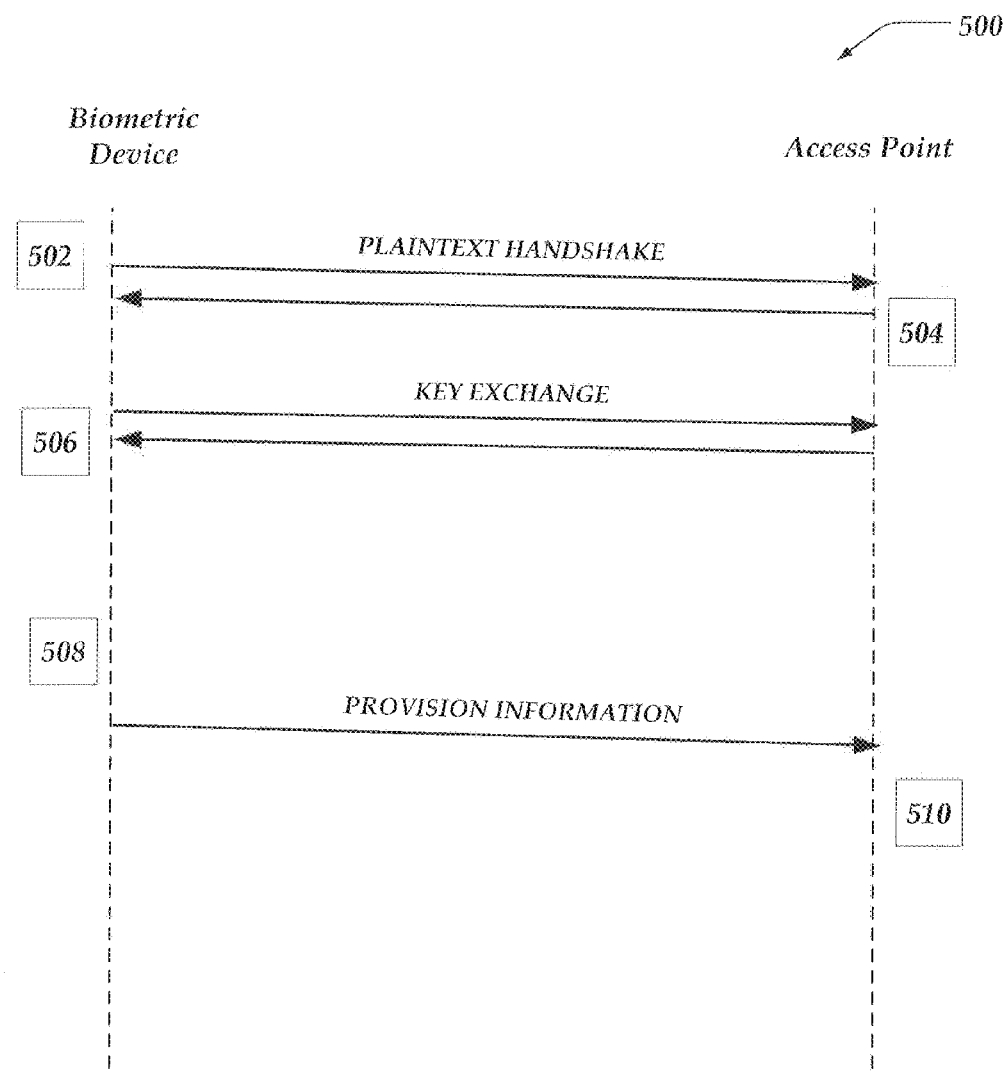
FIG. 5 illustrates a sequence diagram tor a sequence for provisioning a mobile device with an access point or other device in accordance with at least one of the various embodiments.

FIG. 5 illustrates a sequence diagram for sequence 500 for provisioning a mobile device with an access point or other device in accordance with at least one of the various embodiments. At step 502, and step 504, in at least one of the various embodiments, a mobile device and the access point may recognize that they may have encountered each other.

In at least one of the various embodiments, this initial communication may be performed using normal operations of one or more radios and/or radio wireless network protocols that may be included with the mobile device and the access point. In at least one of the various embodiments, this may be a plaintext handshake that establishes a radio and/or network channel for the two devices to communicate. For example, in at least one of the various embodiments, the mobile device and the access point may employ Bluetooth (BT) or Bluetooth Low Energy (BLE) to initiate the provisioning operation.

At step 506, in at least one of the various embodiments, the mobile device and the access point conduct a cryptographic key exchange. In at least one of the various embodiments, one or more cryptographically secure key exchanges may be performed See, FIG. 9.

At step 508, in at least one of the various embodiments, the mobile device may prepare provisioning information and encrypt it using a cryptographic key that was exchanged in step 506. If the provisioning information is prepared, it may be provided to the access point.

At step 510, in at least one of the various embodiments, the access point may verify and authenticate the provided provisioning information using the cryptographic key that was exchanged in step 506. If the provisioning information is not verified the access point will cancel the provisioning operation. Otherwise, if the provisioning information is verified the provisioning information may be stored for later use.

Figure 6:
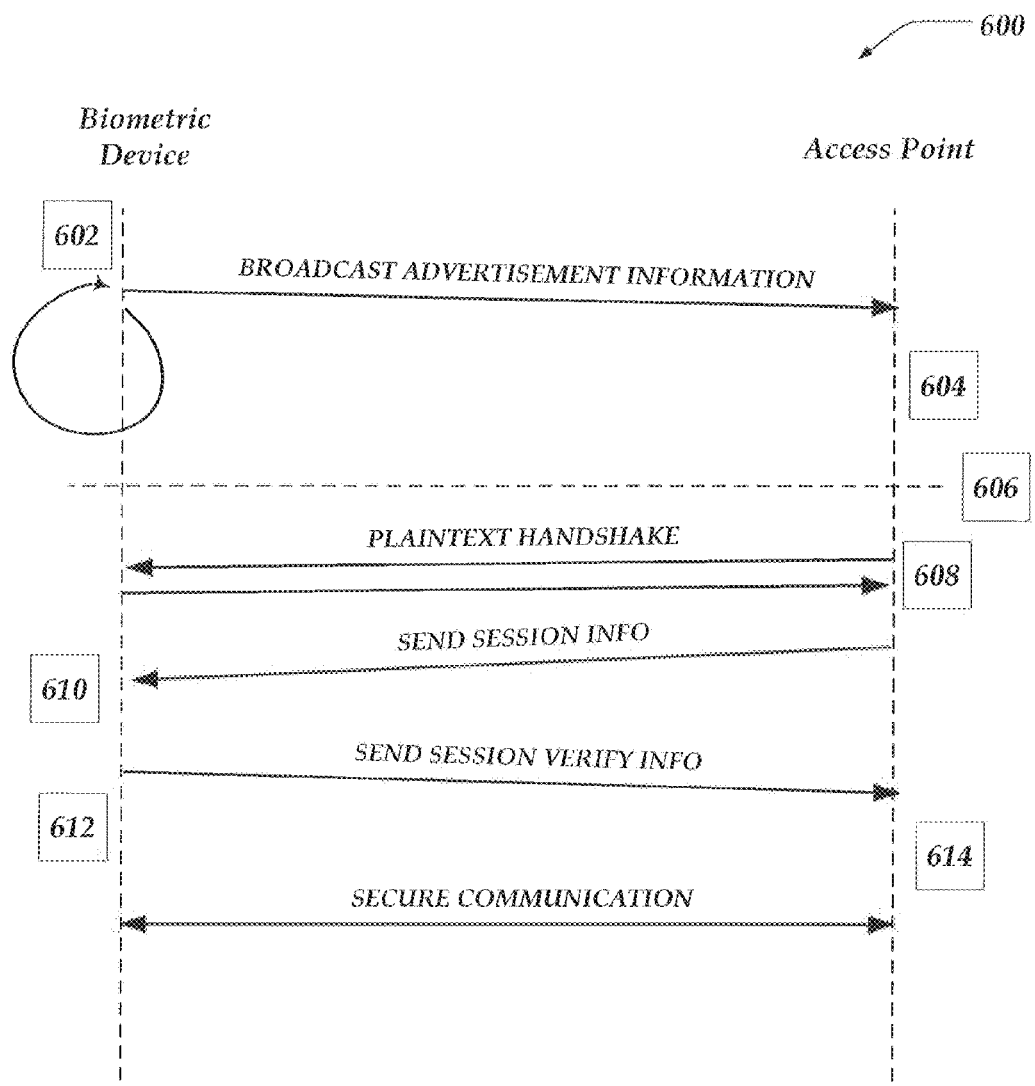
FIG. 6 illustrates a sequence diagram for a sequence for presence advertising in accordance with at least one of the various embodiments.

FIG. 6 illustrates a sequence diagram for sequence 600 for presence advertising in accordance with at least one of the various embodiments. At step 602. in at least one of the various embodiments, the mobile device may broadcast advertising information associated with each of access points it has previously been provisioned with. Accordingly, in at least one of the various embodiments, the mobile device will cycle through each locally stored set of provisioning information (one per access point) waiting for a matching access point that may be in range to respond.

At step 604, in at least one of the various embodiments, access points that are in range of the broadcast will receive the broadcasted advertisement information and attempt to verify that the information is from a provisioned mobile device. In at least one of the various embodiments, if the advertisement information is not verified as being for the current access point, it may be ignored and discarded.

At step 606, in at least one of the various embodiments, if an access point verities that the mobile device is broadcasting advertising information for that access point, it may initiate further the handshaking steps.

At step 608, in at least one of the various embodiments, the access point and the mobile device may engage in an unauthenticated/unsecure handshake to establish an unauthenticated connection. In at least one of the various embodiments, this connection may be established using standard radio protocols, such as, Bluetooth, BLE, NFC, Wi-Fi, or the like.

At step 610, in at least one of the various embodiments, the access point may cryptographically generate verification/authentication information and provide it to the mobile device. In at least one of the various embodiments, this information may include keys, nonces, tokens, or the like, or combination thereof that were generated and/or exchanged when the access point was previously provisioned with the mobile device (e.g., provisioning information). In at least one of the various embodiments, part of the advertisement data from 602 may be employed as a random nonce in the protocol of steps 608, 610 reducing the number of communication rounds to two.

At step 612, in at least one of the various embodiments, if the mobile device is able to authenticate the provisioning information provided by the access point, it may generate a response message that cryptographically incorporates a portion of the provisioning information provided by the access point. The response message will be communicated to access point.

At step 614, in at least one of the various embodiments, the access point cyrptographically verifies that the response message from the mobile device includes the correct and expected information. If the response is verified, the access point and mobile device may proceed to communicate as needed.

Figure 7:
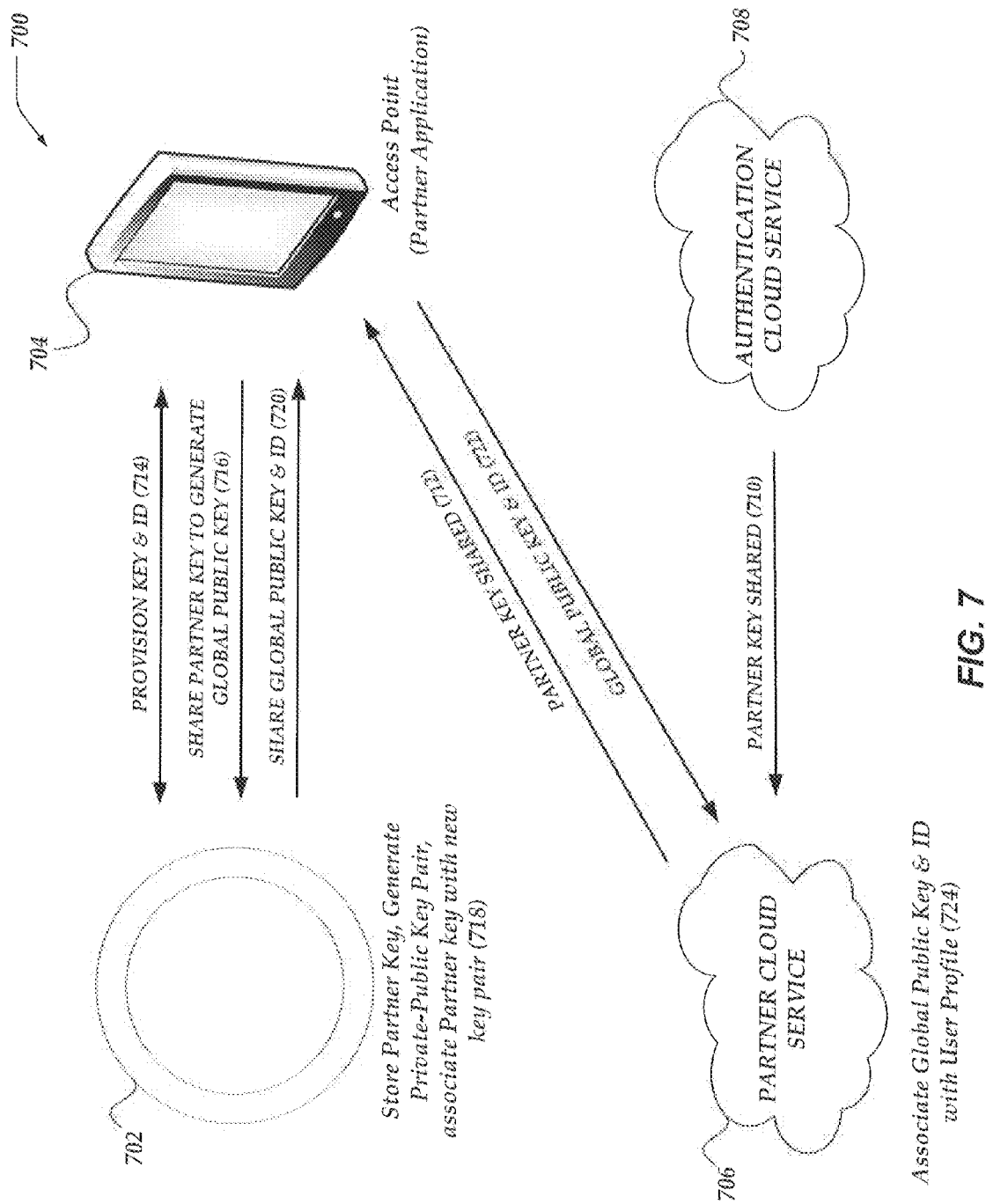
FIG. 7 illustrates a logical diagram of a sequence of operations employed by a system for provisioning a mobile device with a third party cloud service or vendor in accordance with at least one of the various embodiments.

FIG. 7 illustrates a logical diagram of a sequence of operations employed by system 700 for provisioning a biometric device with a third party cloud service or vendor in accordance with at least one of the various embodiments. In at least one of the various embodiments, system 700 may include biometric device 702, access point 704, partner cloud services 706, biometric service cloud servers 708, or the like.

In this illustration, the arrows represent various steps and exchanges that occur in the system. Further, the numbering of the arrows corresponds to the order they may occur. Likewise, they will be described in the order that they may occur.

At step 710, in at least one of the various embodiments, a partner public key will be shared from authentication cloud service 708 and provided to partner cloud service 706. In at least one of the various embodiments, the partner key may be the public key for unique key public-private key pair that is generated specifically for the particular vendor and/or third party service. Further, in at least one of the various embodiments, the authentication cloud service here does not need to be related to biometrics. Instead, in at least one of the various embodiments, its purpose may be for generating partner public-private key pairs, essentially acting a Certificate Authority (CA).

At step 712. in at least one of the various embodiments, the partner public key may be shared from partner cloud service 706 to access point 704. In at least one of the various embodiments, sharing the partner key with the access point enables the access point to have the partner key available for registering biometric devices with the cloud service.

At step 714, in at least one of the various embodiments, access point 704 and biometric device 702 may perform in a key exchange to provision a key and its corresponding identifier (ID). In at least one of the various embodiments, the access point may be arranged to perform actions to enroll a biometric device with the access point. However, in at least one of the various embodiments, simply enrolling the biometric device may not register the biometric device with the cloud server.

At step 716, in at least one of the various embodiments, a global public key may be generated and provided to the biometric device. In at least one of the various embodiments, since the access point may be associated with a cloud server, it may communicate a request to the biometric device to generate a global public key. In at least one of the various embodiments, the request from the access point may be communicated using the communication channel established in step 714. Also, in at least one of the various embodiments, access point 704 may provide the partner key with the global public key request.

At step 718. in at least one of the various embodiments, biometric device 702 may store the partner public key. Also, in at least one of the various embodiments, biometric device 702 may generate a private-public key pair that may be associated with the partner public key. In at least one of the various embodiments, the biometric device may generate a new global public key pair and associate them with the partner key. hi at least one of the various embodiments, the new global key pair will be unique to the particular cloud service that the biometric device may be attempting to register with. In at least one of the various embodiments, the biometric device may generate an alternative identifier (ID) that may be used to reference this particular global key pair. In at least one of the various embodiments, this ID may be smaller (consume less memory) than the global public key. For example, the global public key may be 64 bytes while the ID may be 16 bytes. Accordingly, in at least one of the various embodiments, the ID may be employed to reduce communication bandwidth when global keys are referenced by application.

In at least one of the various embodiments, the global public key pair for the cloud service and its association with a partner key may be stored on the biometric device.

At step 720, in at least one of the various embodiments, biometric device 702 may share the global public key and the ID from step 714 with the access point. In at least one of the various embodiments, biometric device may communicate the global public key and its ID back to the access point using the communication channel established in step 714.

At step 722, in at least one of the various embodiments, the global public key and the ID may be communicated from access point 704 to partner cloud servers 706. In at least one of the various embodiments, access point 704 may be arranged to communicate the global public key and its ID to the partner cloud service. Finally, at step 724, in at least one of the various embodiments, partner cloud service 706 may associate the global public key and the ID with the corresponding user profile. In at least one of the various embodiments, the cloud service may obtain additional information from the access point during the registration process that it may employ to generate a user profile for the user. For example, during registration the access point may request user name, email address, mailing address, telephone number, and so on. This information may be provided to the cloud service for generation of a user profile that may be used tor performing the cloud services. Since, the global public key is unique to the cloud service partner and the biometric device, it may be used to associate the user profile (e.g., user account) that is stored in the cloud service with the user of the biometric device.

Figure 8:
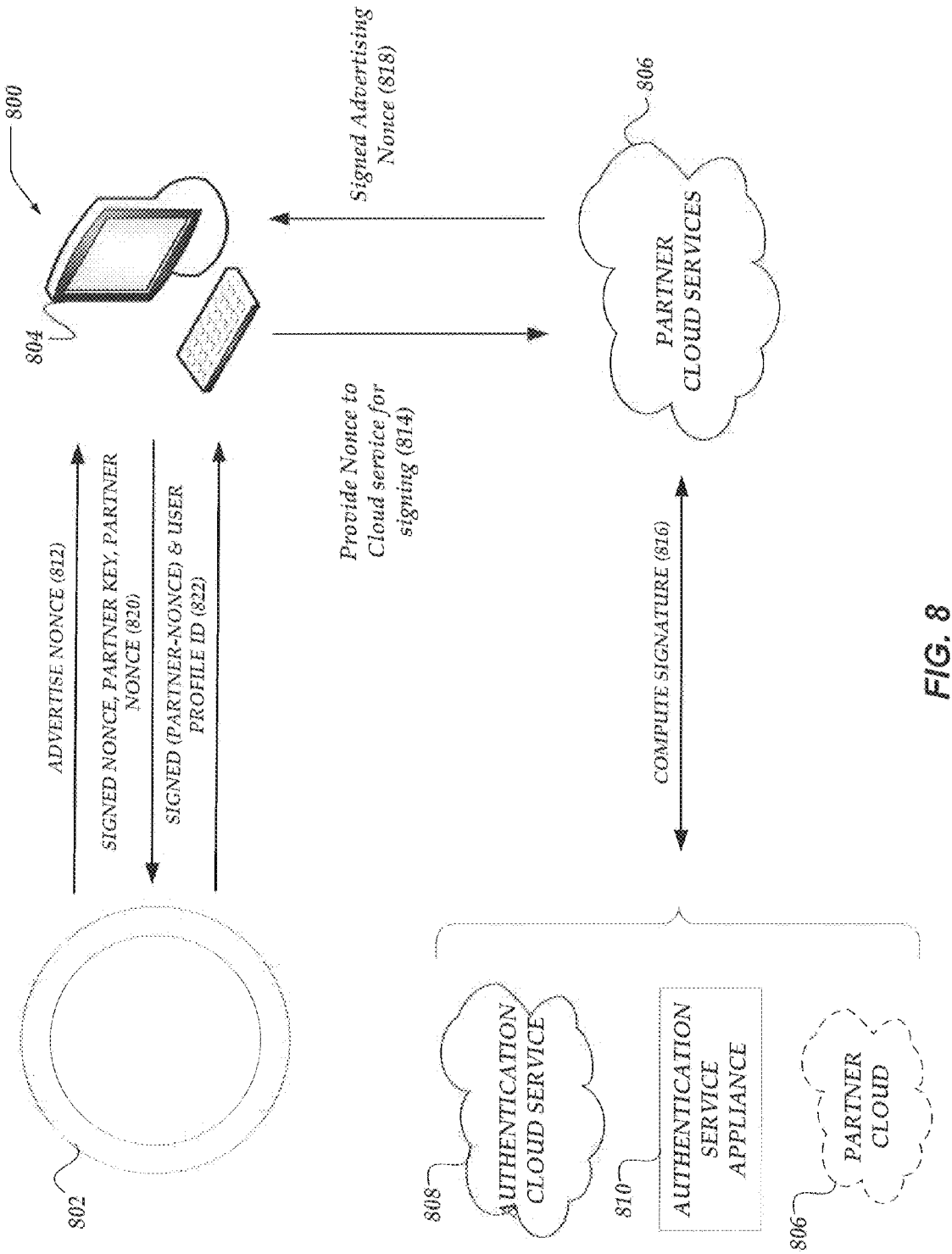
FIG. 8 illustrates a logical diagram of a sequence of operations employed by a system for authenticating a mobile device with a registered third party partner cloud service or partner vendor in accordance with at least one of the various embodiments.

FIG. 8 illustrates a logical diagram of a sequence of operations employed by system 800 for authenticating a biometric device with a registered third party partner cloud service or partner vendor in accordance with at least one of the various embodiments. In at least one of the various embodiments, system 800 may include biometric device 802. access point 804, partner cloud services 806, biometric cloud services 808, biometric service appliance 810, or the like. In this illustration, the arrows represent various steps and exchanges that occur in the system. Further, the numbering of the arrows corresponds to the order the steps may be performed. Likewise, they will be described in the order that they may be performed.

At step 812, in at least one of the various embodiments, biometric device 802 communicates an advertising nonce to access point 804 as per the advertising/presence protocol.

At step 814, in at least one of the various embodiments, access point 804 may communicate the advertisement nonce to partner cloud service 806 for cryptographic signing. In at least one of the various embodiments, the advertisement nonce may be signed using the partner public key.

At step 816, in at least one of the various embodiments, partner cloud services 806 may employ one of various options for signing the advertisement nonce. In at least one of the various embodiments, options for signing the advertisement nonce may include, employing authentication cloud service 808, employing authentication service application 810, or computing the signed advertisement nonce in partner cloud service 806, or the like.

At step 818, in at least one of the various embodiments, a response message that may include a cryptographically signed advertisement nonce signed with the key generated in step 816 may be provided to access point 804.

At step 820, in at least one of the various embodiments, the signed advertisement nonce, partner public key and partner nonce may be communicated from access point 804 to biometric device 802.

At step 822, in at least one of the various embodiments, biometric device 802 may provide the signed partner nonce and a global public key ID, which the partner may have associated with a user profile, back to access point 804. Accordingly, in at least one of the various embodiments, access point 804 may verily that the signed partner nonce is correct, confirming that the uses is the correct user.

Generalized Operation

FIGS. 9-14 represent the generalized operations for cryptographic protocols for wearable devices in accordance with at least one of the various embodiments. In at least one of the various embodiments, processes 900, 1000, 1100,1200, 1300, and 1400 described in conjunction with FIGS. 9-14 may be implemented by and/or executed on a network computer, such as network computer 300 of FIG. 3, client computer 200, and/or mobile device 402, client computers, 102-105, biometric authentication server computer 116, or the like, or combination thereof. Also, in at least one of the various embodiments, one or more of the processes described below may be performed by biometric metric authentication application 216, enrollment application 218, authentication application 321, enrollment application 320, or the like, or combination thereof. Further, in at least one of the various embodiments, the processes described in conjunction with FIGS. 9-14 may perform actions and/or sequences illustrated in FIGS. 5-8.

Furthermore, for brevity and clarity the descriptions below include embodiments and/or examples shown as employing the block cipher AES. One of ordinary skill in the art will appreciate that the processes described below are not limited to the AES cipher may be arranged to employ any cryptographic block cipher.

Figure 9:
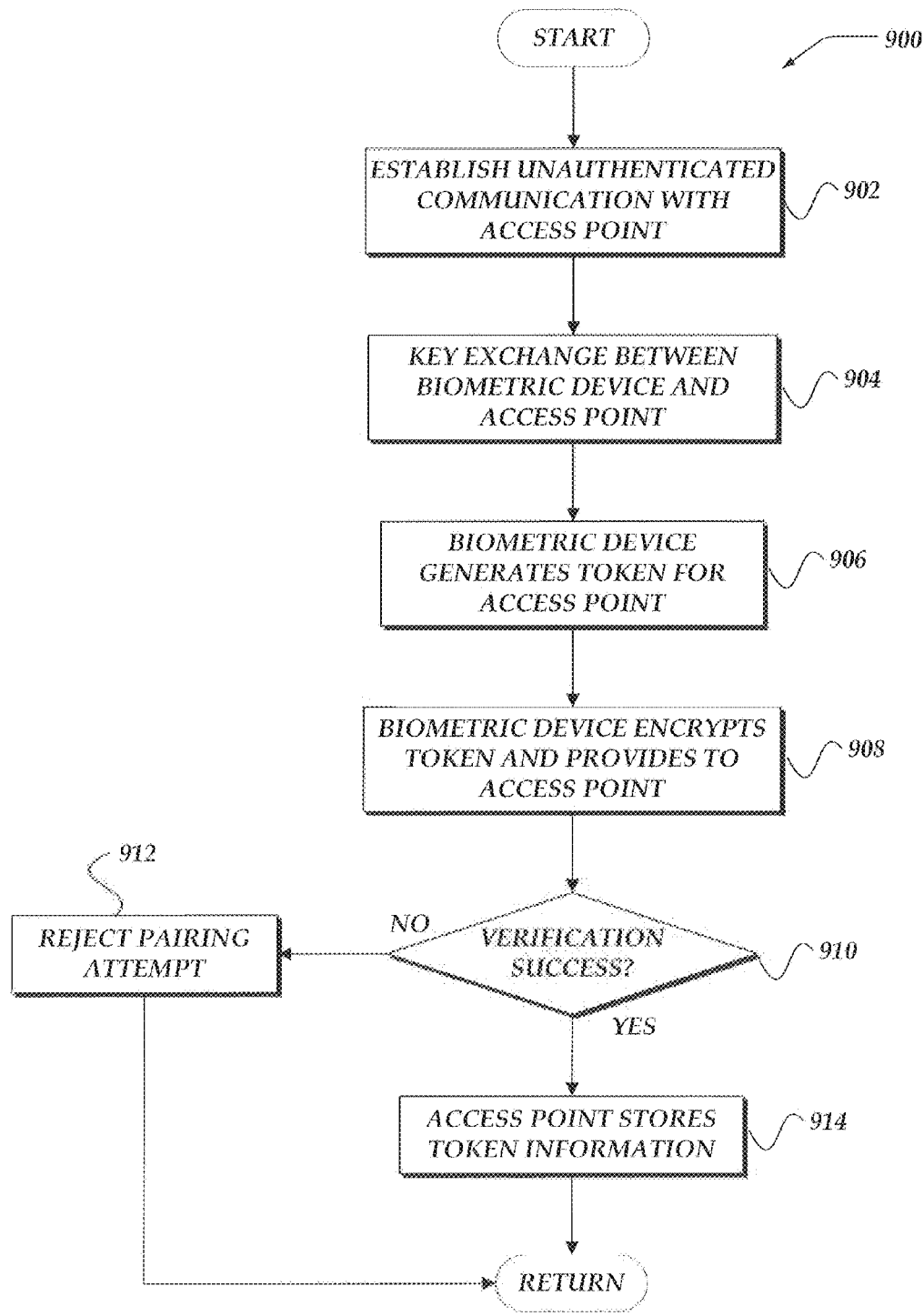
FIG. 9 shows an overview flowchart of a process for provisioning a mobile device with an access point in accordance with at least one of the various embodiments.

FIG. 9 shows an overview flowchart of process 900 for provisioning a mobile device with an access point in accordance with at least one of the various embodiments. In at least one of the various embodiments, process 900 may provision various access points, such as, terminals, kiosks, computers, applications, other devices, or the like, enabling them to communicate with the mobile device.

In at least one of the various embodiments, to save storage space on the mobile device's Bluetooth flash memory, and to allow pairing with a large number of access points, the pairing keys for access points may be generated deterministically by the mobile device using an access point pairing master key $K_{ned}$. Accordingly, in at least one of the various embodiments, the provisioning data for each access point is a tuple, such as, prov=(DeviceId,KID).

In at least one of the various embodiments, if the mobile device enters provisioning mode, it may broadcast a specially formatted message to indicate that it is ready to accept connections from any access point. If an access point connects, the following protocol may be performed. If the connecting access point deviates from the protocol in a detectable way, the mobile device disconnects, and aborts the provisioning attempt.

In at least one of the various embodiments, let $params_{DDH}$ be parameters specifying a prune order group for the purpose of performing a Diffie-Hellman key exchange protocol. In the protocol description below; for clarity and brevity most notation is omitted, except for the explicit use of the group generator g, and the set of integers $Z_p$ that specify the possible exponents used in the key exchange protocol. One of ordinary skill in the art will be familial with the Diffie-Hellman key exchange protocol.

After a start block, at block 902, in at least one of the various embodiments, unauthenticated communication may be established with the access point. In at least one of the various embodiments, the mobile device may be arranged to include one or more radios, such as, BLE. The radios may be employed to communicate with an access point to provision with the mobile device. One or more standard/conventional radio communication protocols may be employed to establish an initial communication channel between the mobile device and the access point.

At block 904, in at least one of the various embodiments, the mobile device and the access point may perform a key exchange. In at least one of the various embodiments, to enable cryptographically secure authentication and communication between the mobile device and the access point, the mobile device may initiate a key exchange protocol for exchanging cryptographic keys with the access point.

In at least one of the various embodiments, the mobile device and the access point may perform a Hashed Diffie-Hellman (HDH) key exchange protocol as follows:

(a) Access point chooses a random exponent $x \in_R Z_p$, computes $h_{AccessPoint} \leftarrow g^x$, and sends $h_{AccessPoint}$ to the mobile device.

(b) the mobile device chooses a random exponent $y \in_R Z_p$, computes $h_{BiometricDevice} \leftarrow g^y$ and $\sigma_{DRM} \leftarrow DRM(h_{BiometricDevice})$, and sends $(h_{BiometricDevice}, \sigma_{DRM})$ to the access point. Here DRM is a function that is used to attest to the authenticity of the mobile device. Specifically, anyone holding an appropriate public key can confirm that $\sigma_{DRM}$ was computed on an original device. The private key needed to compute $\sigma_{DRM}$ is stored in a secure hardware element in the mobile device.

(c) The access point may verify the signature by computing $Verify(PK_{DRM}, h_{BiometricDevice}, \sigma_{DRM})$. If verification fails, the access point disconnects, and aborts the provisioning process.

(d) The access point and the mobile device perform a well-known Short-Authenticated-String (SAS) based Message Mutual-Authentication (MMA) protocol, using the pair $(h_{BiometricDevice}, h_{AccessPoint})$ as the message. However, in at least one of the mobile device, and a matching pattern on the display of the access point. Once the user confirms that the patterns match, this step is completed. If either the protocol itself fails, or the user indicates, either on mobile device, or on the access point, that the patterns do not match, the communication channel between the mobile device and the access point may be closed and the provisioning process may be aborted.

If the above step concludes successfully, both the mobile device and the access point may each compute $K_{tmp} \leftarrow H(g^{xy})$ by computing $H(h_{BiometricDevice}^x)$ and $H(h_{AccessPoint}^y)$ respectively, Where H is a collision resistant cryptographic hash function, such as SHA-256, SHA-512, or the like.

One of ordinary skill in the art will appreciate the $K_{tmp}$ may be generated and/or exchanged using other well-known secure key exchange methods.

At block 906, in at least one of the various embodiments, the mobile device may generate a provisioning token. In at least one of the various embodiments, the token may be a pseudo random nonce that may be generated based on the random number protocols described below. See, FIG. 14. The length of the nonce may vary depending on the level of security/attack resistance that may be required. Also, features of the encryption ciphers (key size, block size, or the like) may influence the selection of the length of the nonce. In at least one of the various embodiments, the size of the nonce may be determined from a configuration value stored in the mobile device, or in some embodiments, user input may be employed to determine the length of the nonce. In at least one of the various embodiments, the token may be employed to cryptographically generate a key. For example, in at least one of the various embodiments, the mobile device may generate a 128-bit long pseudorandom nonce $tok_{ned}$ and computes $K \leftarrow AES_{K_{ned}}(tok_{ned})$. Here in this example, the token nonce is encrypted with a block cipher (e.g., AES) using the secret $K_{ned}$ to generate a unique key for the access point that is being provisioned.

At block 908, in at least one of the various embodiments, the mobile device may encrypt the token information and communicate it to the access point. In at least one of the various embodiments, the mobile device may encrypt the token (e.g., $tok_{ned}$) before sending to the access point. In at least one of the various embodiments, the mobile device may compute $C_0 \leftarrow AES_{Ktmp}(K)$, $tag \leftarrow AES_{Ktmp}(AES_{Ktmp}(C_0)$ XOR $tok_{ned}))$, and send the token information, $C=(C_0, tok_{ned}, tag)$ to the access point. Note, in at least one of the various embodiments, $K_{tmp}$ is the key that was generated and exchanged between the mobile device and the access point in block 904.

At decision block 910, in at least one of the various embodiments, if the access point verifies the encrypted token, control may flow to block 914; otherwise, control of the process may flow to block 912.

In at least one of the various embodiments, the access point may cryptographically verify the token information provided from the mobile device (block 908). In at least one of the various embodiments, if the access point receives C from a mobile device, it may parse C into its constituent components as (C0, $tok_{ned}$, tag), The access point may then verify that $tag=AES_{Ktmp(AESKtmp(C0)}$ XOR $tok_{ned}))$, and rejects the pairing attempt if the verification fails. Note, in at least one of the various embodiments, $K_{tmp}$ is the key that was generated and exchanged between the mobile device and the access point in block 904.

At block 912, in at least one of the various embodiments, since the mobile device failed the verification step, the provisioning attempt is rejected. Next, control may be returned to a calling process. At block 914, in at least one of the various embodiments, since the mobile device is verified, the access point may be stored the token information for future use in other cryptographic protocols discussed below. For example, in at least one of the various embodiments, If the verification is successful, the access point may compute provisioning key $K=AES_{Ktmp}^{-1}(C_0)$, and stores the pair (K, $tok_{ned}$) in local storage. Next, control may be returned to a calling process.

Figure 10:
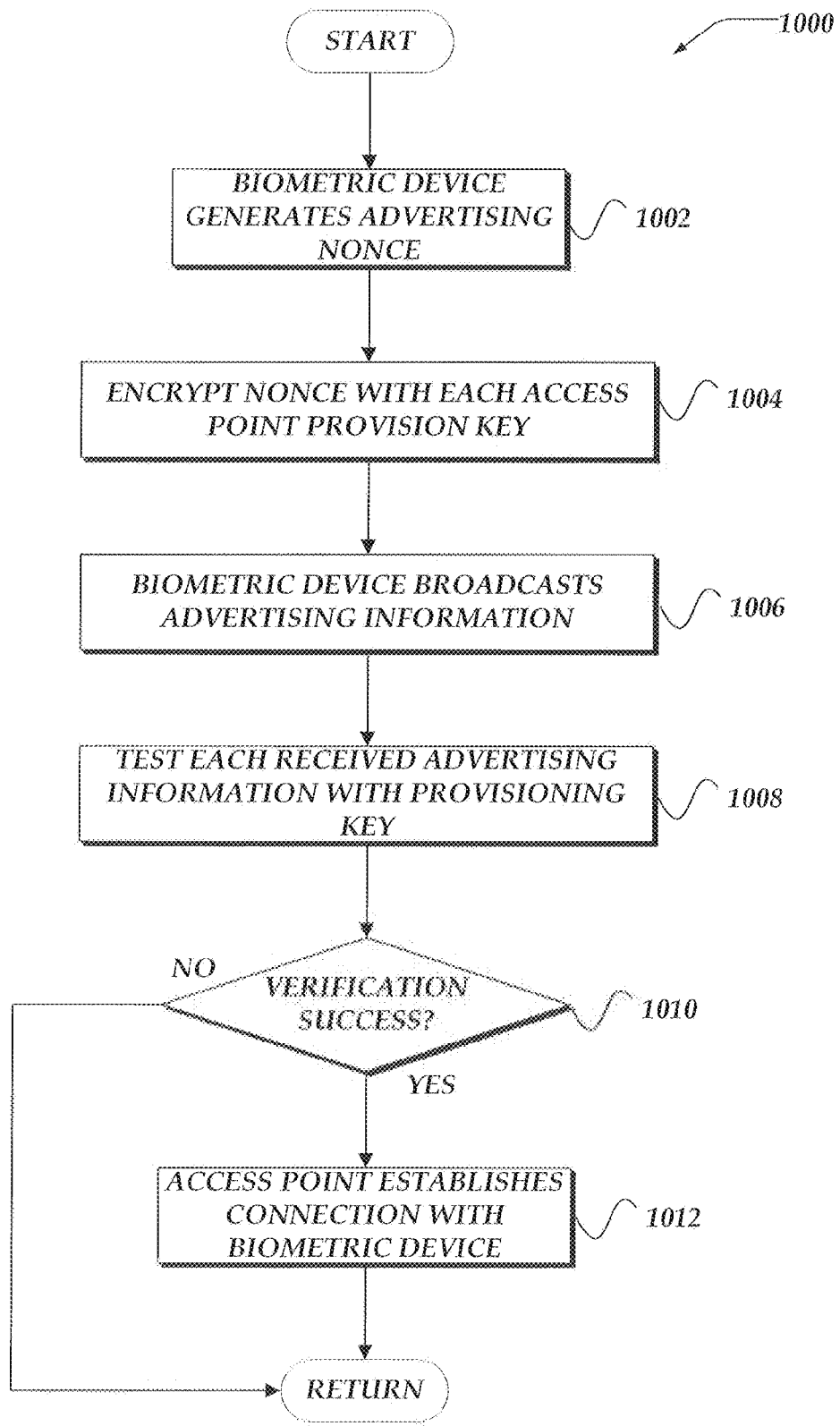
FIG. 10 shows an overview flowchart of a process for presence advertising performed by a mobile device in accordance with at least one of the various embodiments.

FIG. 10 shows an overview flowchart of process 1000 for presence advertising performed by a mobile device in accordance with at least one of the various embodiments. After a start block, at block 1002, in at least one of the various embodiments, the biometric may generate an advertising nonce. In at least one of the various embodiments, the advertising nonce may be a 128-bit long pseudo random number. In at least one of the various embodiments, the mobile device may generate the 128-bit long pseudorandom nonce $n_{adv}$.

At block 1004, in at least one of the various embodiments, the mobile device may encrypt the advertising nonce with each provisioning key from its store of access point provisioning keys. In at least one of the various embodiments, for each provisioned access point key Kl that was generated by the procedure described in FIG. 9, the mobile device computes $\tau_i \leftarrow AES_{Kl}(n_{adv})$.

At block 1006, in at least one of the various embodiments, the mobile device may broadcast the advertising information that includes the advertising nonce and the encrypted nonce. In at least one of the various embodiments, as described above the mobile device may be arranged to include one or more radio communication facilities, such as, Bluetooth. BLE, NFC, or the like. Accordingly, onboard radio may be employed to broadcast the advertising information. In at least one of the various embodiments, the advertising procedure may be performed periodically. The period may be predefined and/or configured duration.

In at least one of the various embodiments, during a broadcast period (e.g., a 15 minute period), the mobile device may broadcast, one at a time, the tuple $(n_{adv}, \tau_i)$ for each i (once for each access point provisioning key). In at least one of the various embodiments, the advertisement information may be changed/rotated to values that correspond to another access point at the expiration of a configured/defined time period (e.g., every 200 ms). Additionally, each mobile device may include in its advertisement information one or more additional strings that may non-cryptographically (e.g., in plain text) identify it as a mobile device.

At block 1008, in at least one of the various embodiments, an access point that receives the encrypted advertising information may cryptographically compare the information to its provisioning keys. In at least one of the various embodiments, on access point may be arranged to continuously listen for transmissions from nearby mobile devices, and for each, received value $(n_{adv}, \tau_i)$ to access point may compare whether it has a provisioning key K such that $\tau_i = AES_K(n_{adv})$. This may require trying several keys since each access point may be provisioned with one or more mobile devices each with its own corresponding provisioning key. if no match is found, the access point may assume that it is not provisioned to the mobile device that is advertising its presence.

At decision block 1012, in at least one of the various embodiments, if the access point verifies that the advertising information is associated with a provisioned mobile device, control may flow to block 1012; otherwise, control may be returned to a calling process. At block 1012, in at least one of the various embodiments, the mobile device and the access point may employ the advertising information to communicate. See, FIG. 11. Next, control may be returned to a calling process.

Figure 11:
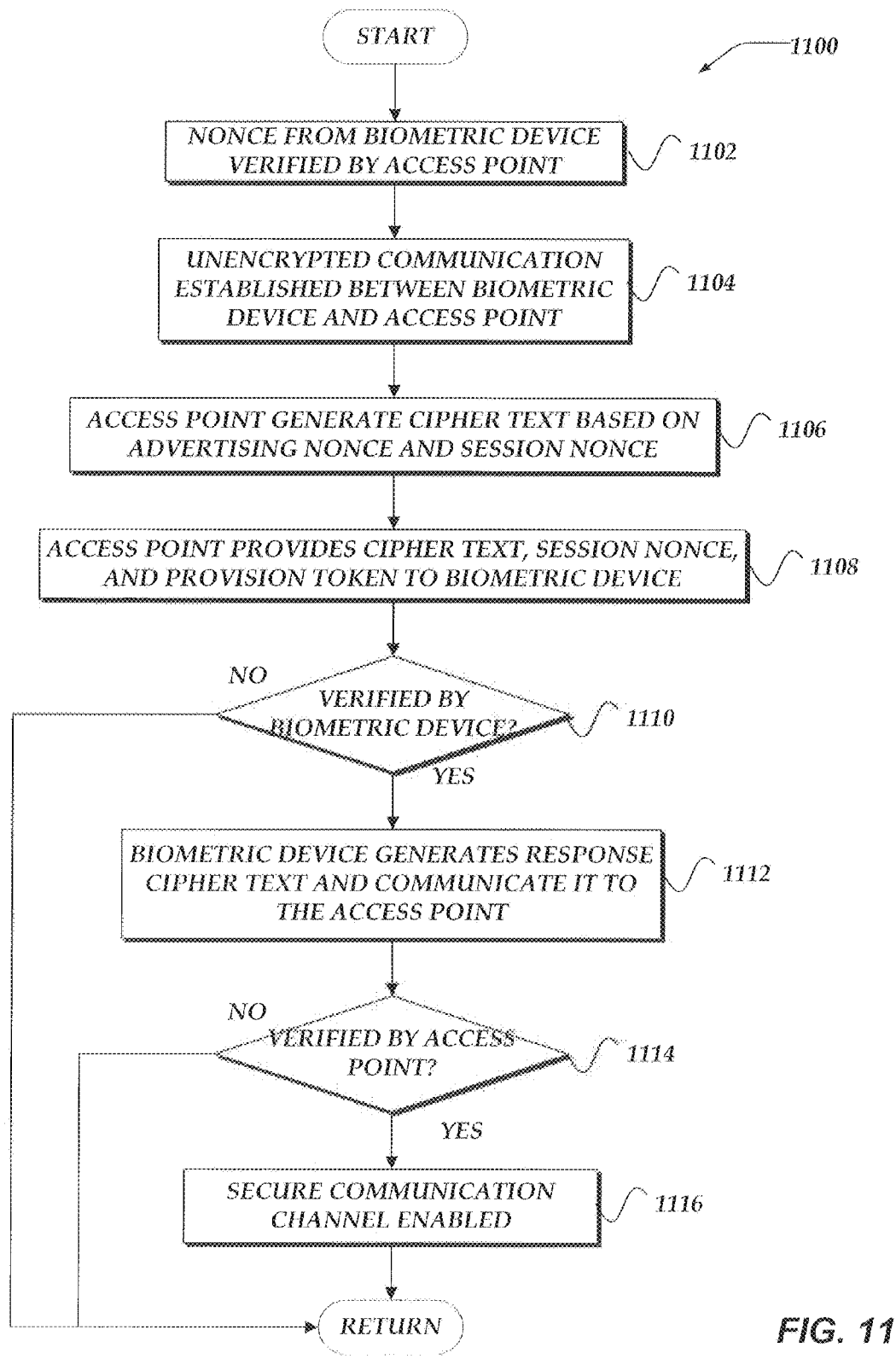
FIG. 11 shows an overview flowchart of a process for establishing a communication channel between a provisioned/paired mobile device and an access point in accordance with at least one of the various embodiments.

FIG. 11 shows an overview flowchart of process 1100 for establishing a communication channel between a provisioned/paired mobile device and an access point in accordance with at least one of the various embodiments. After a start block, at block 1102, in at least one of the various embodiments, the advertising nonce is verified as per FIG. 1000.

At block 1104, in at least one of the various embodiments, an unencrypted communication channel may be established between the mobile device and the access point. In at least one of the various embodiments, the mobile device may be arranged to include one or more radios, such as, Bluetooth, BLE, NFC, Wi-Fi, or the like. Such radios may be employed to communicate with an access point to provision for the mobile device. One or more standard/conventional radio communication protocols may be employed to establish the unencrypted communication channel between the mobile device and the access point.

At block 1106, in at least one of the various embodiments, the access point may generate a cipher text based on the advertising nonce and a session nonce. For example, in at least one of the various embodiments, the access point may compute modified advertising nonce $n_{adv}^{(1)}$ by flipping one or more predefined bits of the advertising nonce, where the value of the modified advertising nonce is different than the advertising nonce and any other. Accordingly, the bits defined for flipping may be determined such that the resulting modified advertising nonce has a different value than other modified advertising nonce used with this access point. For example, in at least one of the various embodiments, the advertising nonce may be modified by flipping the last bit of the previously provided advertising nonce $n_{adv}$. Further, in at least one of the various embodiments, the access point may also generate a random session nonce $n_{ses}$. And, in at least one of the various embodiments, the access point may be arranged to compute test value $t=AES_K(n_{adv}^{(1)})$—encrypting the modified advertising nonce using the provisioning key for this access point.

At block 1108, in at least one of the various embodiments, the access point may provide the t, the session nonce $n_{ses}$, and the provisioning token $tok_{ned}$ to the mobile device. For example, in at least one of the various embodiments, the access point may communicate a 3-tuple such as ($n_{ses}$, t, $tok_{ned}$) to the mobile device.

At decision block 1110, in at least one of the various embodiments, if the information provided by the access point is verified by the mobile device, control may flow to block 1112; otherwise, the; communication attempt may be aborted and control may he returned to a calling process. For example, in at least one of the various embodiments, the mobile device may compute provision key $K=AES_{Kned}(tok_{ned})$, and verify the communication be confirming that $AES_K(n_{adv}^{(1)})=t$.

At block 1112, in at least one of the various embodiments, the mobile device may generate a response cipher text and communicate it to the access point. For example, in at least one of the various embodiments, if the verification in decision block 1110 is successful, the mobile device may compute $t'=AES_K(n_{ses})$ and communicates t' to the access point.

At decision block 1114, in at least one of the various embodiments, if the response cipher text (e.g, t') generated by the mobile device is verified, control may flow to block 1116; otherwise, the communication attempt may be abort and control may be returned to a calling process. In at least one of the various embodiments, the access point may compute $n^{(1)}$ as above, and verify that $t'=AES_K(n_{ses})$. If the verification is successful, the access point may proceed to communicate as needed using the protocol described below. In contrast, if the verification fails, the access point may abort the communication attempt and drop the connection.

Figure 12:
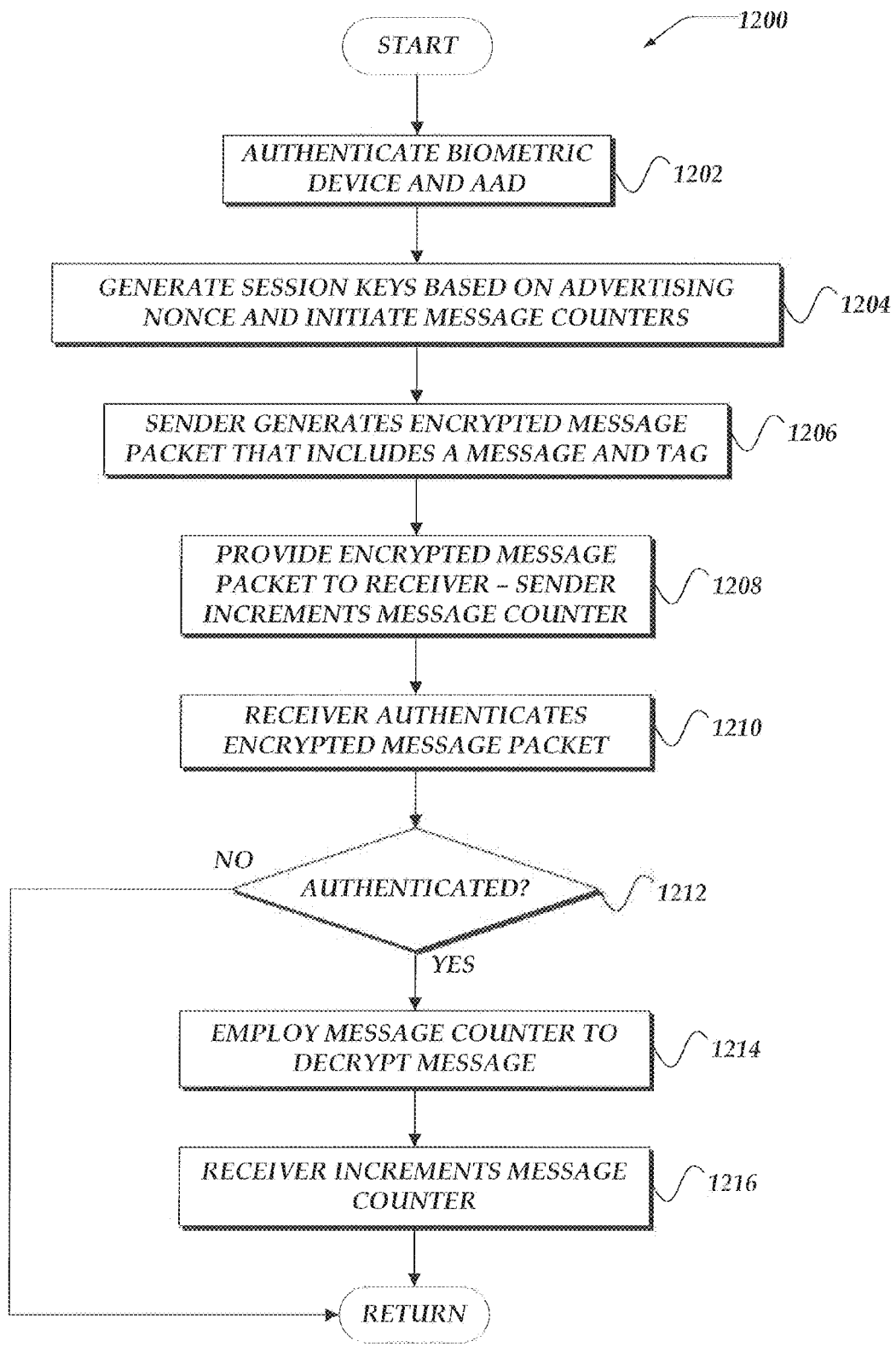
FIG. 12 shows an overview flowchart of a process for communication between a provisioned/paired mobile device and an access point in accordance with at least one of the various embodiments.

FIG. 12 shows an overview flowchart of process 1200 for communication between a provisioned/paired mobile device and an access point in accordance with at least one of the various embodiments. In at least one of the various embodiments, if the mobile device and the access point have completed the protocol as described above, they may encrypt and authenticate messages for communication. In at least one of the various embodiments, messages may be arranged to have a fixed length payload that may be encrypted and authenticated to produce a slightly larger packet. In at least one of the various embodiments, a message payload may be 12 bytes and a complete encrypted message packet may be 20 bytes. In other embodiments, message payload and encrypted message packet size may be larger or smaller. Such sues may be determined based on a predefined configuration value.

After a start block, at block 1202, in at least one of the various embodiments, the mobile device and the access point may be authenticated with each other using the protocol described in FIG. 9.

At block 1204, in at least one of the various embodiments, session keys may be generated based on an advertising nonce and messages counters may be initiated. In at least one of the various embodiments, both the mobile device and the access point may generate a 16-byte session keys $K_s=AES_K(n_{adv}^{(2)})$ where the modified advertising nonce $n_{adv}^{(2)}$ may be generated by flipping one or more predefined bits of the advertising nonce, where the value of the modified advertising nonce is different than the advertising nonce and any other. Accordingly, the bits defined for flipping may be determined such that the resulting modified advertising nonce has a different value than other modified advertising nonce used with this access point. For example, in at least one of the various embodiments, the advertising nonce may be obtained from the previously provided $n_{adv}$ by flipping the second to last bit of the advertising nonce $n_{adv}$ (note that this guarantees that $n_{adv}$, $n_{adv}^{(1)}$, and $n_{adv}^{(2)}$ are distinct). Also, key K is the provisioning key described above. Additionally, cntr may be a message counter that may be arranged to count the total number of 12-byte messages exchanged between the mobile device and the access point during the current session. Before messages are transmitted for a session, cntr is initialized to 0. Accordingly. cntr is incremented every nine a 12-byte message is sent or received. In at least one of the various embodiments, cntr may be restricted to a length of 8 bytes. Thus, in at least one of the various embodiments, the maximum number of messages that may be exchanged in a session may be $2^{64}$. In other embodiments, the message counter may be shorter or longer, with the encrypted message packet size changed accordingly.

At block 1206, in at least one of the various embodiments, the sender may generate an encrypted message packet that includes the message and a tag. For example, in at least one of the various embodiments, Given a 12 byte value m to send, compute $C_1=AES_{Ks}(cntr)[0 \ldots 11]$ XOR m, and compute $t=AES_{Ks}(C_1)[0 \ldots 7]$. Accordingly, the first 12 bytes of $AES_{Ks}(cntr)$ are XOR'd with the 12-byte message m. Likewise, the first 8 bytes of $AES_{Ks}(C_1)$ is used as t.

At block 1208, in at least one of the various embodiments, the encrypted message packet may be provided to the receiver. And, the sender may increment its message counter. Accordingly, in at least one of the various embodiments, set $C=(C_1, t)$ and send C to the receiver.

At block 1210, in at least one of the various embodiments, the receiver may perform actions to authenticate the encrypted message packet. For example, to authenticate and decrypt a received 20-byte encrypted message packet C, set $C_1$ to be the first 12 bytes, and t the last 8 bytes. Then. verify that $t=AES_{Ks}(C_1)[0 \ldots 7]$ where t is ther first 8 bytes of $AES_{Ks}(C_1)$. If the verification fails, the message may be rejected and the connection terminated.

At decision block 1212, in at least one of the various embodiments, if the encrypted message packet is authenticated, control may flow to block 1014; otherwise, control may be returned to a calling process.

At block 1214, in at least one of the various embodiments, the receiver of an encrypted message packet may decrypt the message portion that is included in the encrypted message packet. For example, in at least one of the various embodiments. If verification was successful, compute m $=\text{AES}_{Ks}$(cntr)[0 . . . 11] XOR $C_j$. Note, that for this to work, cntr must have the .same value on the sending and receiving sides.

At block 1216, in at least one of the various embodiments, the receiver of the encrypted message packet may increment its message counter. For example, in at least one of the various embodiments, after successfully sending or receiving a message update cntr by setting cntr=cntr+1. Next, control may be returned to a calling process.

Figure 13:
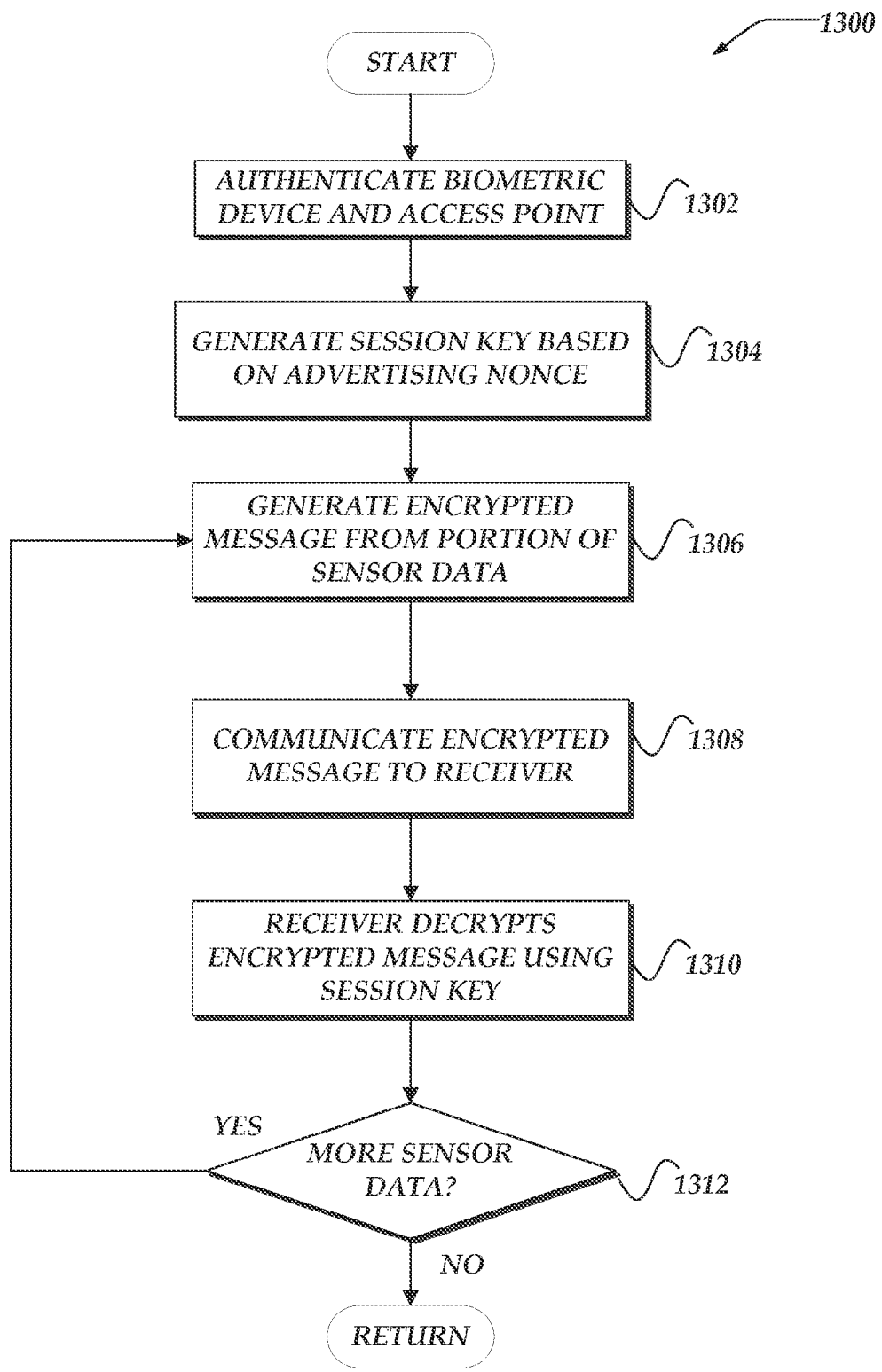
FIG. 13 shows an overview flowchart of a process for communication of biometric data/signals between a paired mobile device and an access point in accordance with at least one of the various embodiments.

FIG. 13 shows an overview flowchart of process 1300 for communication of biometric data/signals between a paired mobile device and an access point in accordance with at least one of the various embodiments. In at least one of the various embodiments, to protect the content of streaming sensor data, a strong pseudorandom-permutation may applied directly to the streamed data. After a start block, at block 1302, in at least one of the various embodiments, a mobile device and an access point may be paired and authenticated with each other.

At block 1304, in at least one of the various embodiments, the mobile device may generate a session key based on the advertising nonce. For example, in at least one of the various embodiments, a 16-byte session key may be computed such as $K_{so}=\text{AES}_K(n_{adv}^{(3)})$ where modified advertising nonce $n_{adv}^{(3)}$ may be generated by flipping one or more predefined bits of the advertising nonce, where the value of the modified advertising nonce is different than the advertising nonce and any other. Accordingly, the bits defined for flipping may be determined such that the resulting modified advertising nonce has a different value than other modified advertising nonce used with this access point. For example, in at least one of the various embodiments, the advertising nonce may he obtained from the previously provided advertising nonce $n_{adv}$ by flipping the second before the last bit of $n_{adv}$ and K is the provisioning key.

At block 1306, in at least one of the various embodiments, an encrypted message may be generated from a portion of sensor data captured by the mobile device. For example, in at least one of the various embodiments, to encrypt a 16-byte message m, compute $C=\text{AES}_{Ksu}(m)$. At block 1308, in at least one of the various embodiments, the encrypted message may be communicated to a receiver (e.g., AAD). At block 1310, in at least one of the various embodiments, the receiver may decrypt the message by employing the session key. For example, $m=\text{AES}_{Ksu}(C)$. At decision block 1312, in at least one of the various embodiments, if there is more sensor data to send, control may loop back to block 1306; otherwise, control may be returned to a calling process.

In at least one of the various embodiments, the actions of process 1200 may be slightly modified tor communicating messages having an arbitrary length. In addition to the session key, a message authentication code (MAC) key may be generated by $K_{mac}=\text{AES}_K(n_{adv}^{(3)})$ where modified advertising nonce $n_{adv}^{(3)}$ is obtained from the previously provided $n_{adv}$ by flipping the third bit of the advertising nonce $n_{adv}$ (note that this guarantees that $n_{adv}$, $n_{adv}^{(1)}$, $n_{adv}^{(2)}$, and $n_{adv}^{(3)}$ are distinct).

In at least one of the various embodiments, encryption and authentication of messages may be done as follows. To send a message m of l bytes, where l is divisible by the block size (16 in this example), $C=\text{AES-CTR}_{Ks,cntr}(m)$ may be generated, and update cntr←cntr+l/16. Here, $\text{AESCTR}_{Ks}$, cntr(m) denotes a block-cipher (AES in this example), chained using the well-known counter mode, where the counter is initialized to cntr. Finally, compute $t=\text{HMAC}_{Kmac}(C)$, and send the tuple (C, t) to the recipient. Note, t is computer using a standard hash function based message authentication code (HMAC). In at least one of the various embodiments, other message authentication codes may be employed without departing from the scope of the innovation described herein.

In at least one of the various embodiments, AES-CTR mode may be modified by maintaining the value of the counter as a long-term stale for the duration of each session. In other embodiments, normal use of AES-CTR may restart the counter each time a message is sent, allowing an attacker to potentially rearrange messages unless other measures are taken. In at least one of the other embodiments, maintaining the counter throughout the session may avoid the need for additional overhead required to resist message re-ordering.

In at least one of the various embodiments, decryption for arbitrary length messages may be performed as expected. Accordingly, to decrypt, confirm the HMAC by computing it locally as $\text{HMAC}_{Kmac}(C)$, where $K_{mac}$ is the receiver's copy of the MAC key, and C is the received ciphertext from the tuple provided by the sender. If the locally computed MAC is equal to t, apply the standard AESCTR (e.g., a block-cipher counter mode) decryption algorithm to C to decrypt the message.

Figure 14:
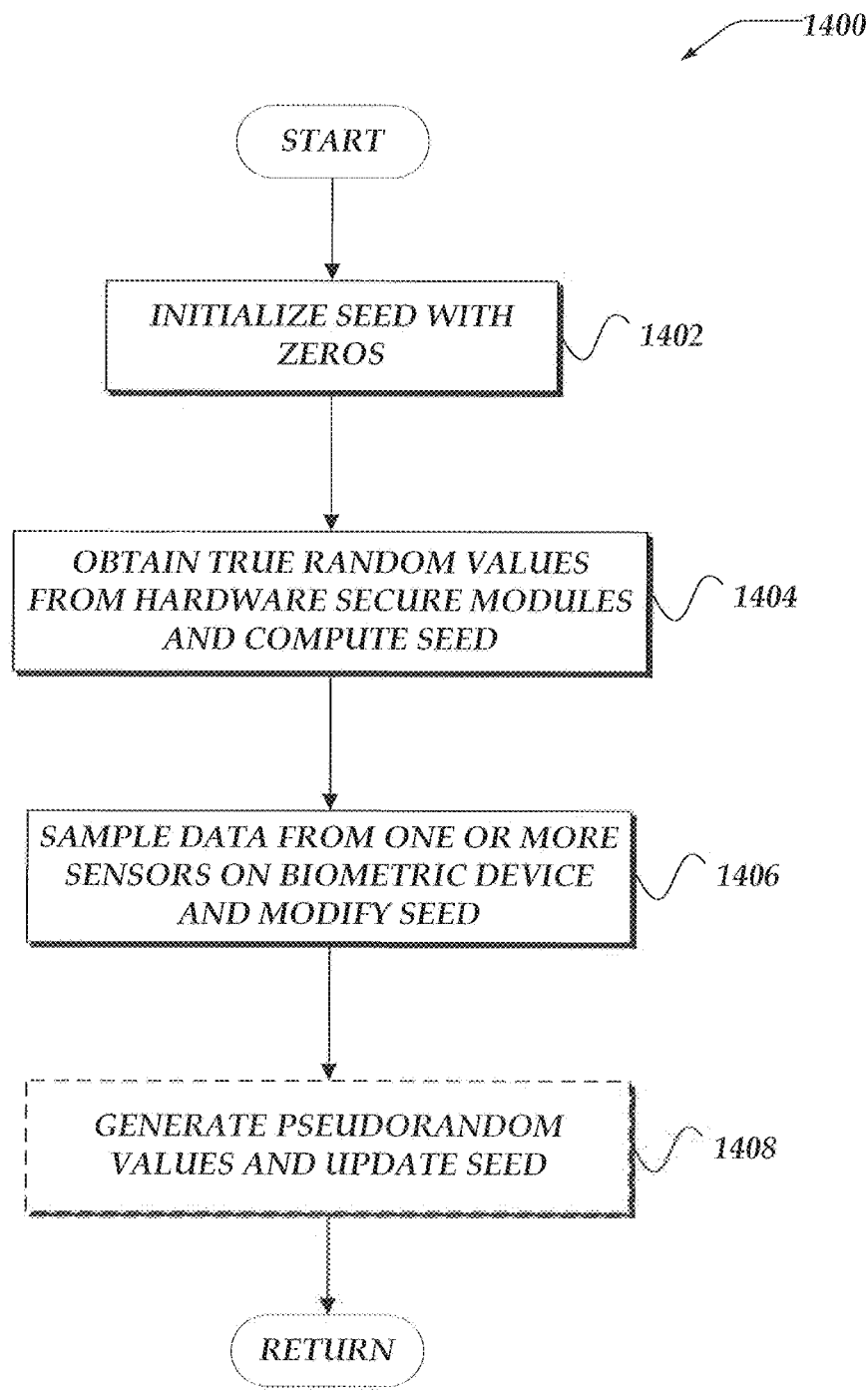
FIG. 14 shows an overview flowchart of a process tor generating randomness in accordance with at least one of the various embodiments.

FIG. 14 shows an overview flowchart of process 1400 for generating randomness in accordance with at least one of the various embodiments. In at least one of the various embodiments, randomness may be employed in one or more of the protocols employed by the mobile device to communicate with access points. Accordingly, in at least one of the various embodiments, a mobile device may be arranged to include facilities for generating cryptographically truly random number and cryptographically pseudo-random number.

After a start block, at block 1402, in at least one of the various embodiments, a seed value may be initialized to be all zeros. In at least one of the various embodiments, the seed may be selected to be an appropriate length. For example, the seed length may be selected to conform to the key lengths and/or message lengths for block ciphers, hash function, cipher attack resistance, or the like, or combination thereof. In at least one of the varying embodiments, the seed length may be arranged to be 128-bits. For example, let $K_{prgseed}$←00 . . . 0 be a 128-bit long value initialized with zeros at all positions.

At block 1404, in at least one of the various embodiments, one or more true random values may be obtained from one or more hardware secure modules (HSMs) and employed for computing a random number seed. In at least one of the various embodiments, a mobile device may be arranged to include one or more hardware secure modules. Hardware secure modules are well-known secure, tamper-resistant micro chips systems that are arranged to provide various cryptographic services, such as, true random number generation, key generation, key storage, encryption/decryption support, secure hash functions, or the like, or combination thereof. Accordingly, the services provided by the one or more HSMs may be employed to generate a true random number. In at least one of the various embodiments, the random number seed may be updated from all zeros to a result based on cryptographically hashing the truly random numbers from the HSMs. For example, for each HSM that is available, query the HSM to obtain a true random value $S_{HSM}\in\{0,128\}^{128}$. If the output is shorter than 128 bits, pad $S_{HSM}$ with zeros to length 128. Set $K_{prgseed}$←$H(K_{prgseed}, S_{HSM})$.

At block 1406, in at least one of the various embodiments, one or more of the sensors on the mobile device may be sampled to generate additional entropy that may be employed to modify the random number seed. In at least one of the various embodiments, as discussed above, the mobile device may include one or more sensors, including biometric sensors, and/or environmental sensors. Accordingly, signal and/or data from these sensors may be captured and employed for generating randomness for used in the communication protocols. For example, in at least one of the various embodiments, For each sensor T with a min-entropy of $k_T$ bits per sample, let $k'_T = \lceil 128/k_T \rceil$.. Collect $l = k'_T$ samples $x_1, \ldots, x_l$, and set $K_{prgseed} \leftarrow H(K_{prgseed}, x_1, \ldots, x_l)$.

At block 1408, in at least one of the various embodiments, optionally, pseudorandom numbers may be generated such that the seed is updated using information from the previously generated pseudorandom number. In at least one of the various embodiments, generating pseudo-random number may employ one or more cryptographic operations. In at least one of the various embodiments, steps conforming to forward secure pseudo-random number generation may be employed. However, in at least one of the various embodiments, other cryptographically secure pseudo random number generating methods may be employed. In at least one of the various embodiments, each time a pseudo-random number is generated, the random number seed (e.g., $K_{prgseed}$) may be updated based on the previously generated pseudo-random number, or the like.

For example, in at least one of the various embodiments. To generate n 128-bit long pseudorandom values $r_1, \ldots, r_n$:

1. Compute $ri \leftarrow AES_{K_{prgseed}}(i)$, where l ranges from 0 to n.
2. Update $K_{prgseed}$ in the flash memory by setting $K_{prgseed} \leftarrow r_0$.
3. Return $r_1, \ldots, r_n$.

Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for employing a mobile device to communicate data over a network, wherein the mobile device performs actions, including:

communicating a provisioning key and a provisioning token that corresponds to at least one remote access point for provisioning the at least one remote access point for communication with the mobile device, wherein the provisioning key and the provisioning token that corresponds to a provisioned remote access point are locally stored by the mobile device and the provisioned remote access point;

communicating an advertising nonce and an encrypted advertising nonce to the provisioned remote access point, wherein the provisioned remote access point employs its locally stored provisioning key to decrypt the encrypted advertising nonce and compare the decrypted advertising nonce to the advertising nonce; and when the provisioned remote access point communicates an equivalent result for the comparison of the advertising nonce and the decrypted advertising nonce, performing further actions, including:

establishing a communication channel with the provisioned remote access point based on the advertising nonce and a session nonce generated by the provisioned remote access point and its corresponding provisioning key;

generating a modified advertising nonce based on flipping one or more predefined bits of the advertising nonce, wherein the value of the modified advertising nonce is different than the advertising nonce and any other advertising nonce, and wherein a test value is generated based on encrypting the modified advertising nonce using the provisioning key;

generating a session key for communicating with the provisioned remote access point based in part on the modified advertising nonce and a message counter, wherein the provisioned remote access point generates a remote message counter;

encrypting the message counter using the session key to generate an encrypted message counter;

generating at least one message packet that includes a message that is encrypted in part by combining the encrypted message counter and the message using an exclusive-or operation, and a message authentication tag; and communicating the at least one encrypted message packet with the provisioned remote access point.

2. The method of claim 1, wherein the provisioning the at least one remote access point, further includes:

exchanging a temporary key with the at least one remote access point;

generating the provisioning token based on a pseudorandom number; and generating the provisioning key based on encrypting the provisioning token using a secret key that is stored on the mobile device, wherein the provisioning token is communicated to the at least one remote access point for verification.

3. The method of claim 1, wherein communicating the advertising nonce and the encrypted advertising nonce for the provisioned remote access point, further comprises:

generating a separate advertising nonce based on a pseudorandom number; and encrypting the separate advertising nonce for the provisioned remote access point using its provisioning key.

4. The method of claim 1, wherein establishing the communication channel with the provisioned remote access point, further comprises:
generating the session nonce based on a pseudorandom number; and communicating a 3-tuple that includes the session nonce, the test value, and the provisioning token to the access point.

5. The method of claim 1, wherein generating the session key; further comprises,
encrypting the session key based on the modified advertising nonce and the provisioning key.

6. The method of claim 1, wherein generating the at least one message packet, further comprises:
encrypting the message based on the encrypted message counter;
generating the message authentication tag by encrypting a portion of the encrypted message using the session key; and
generating a tuple that includes the encrypted message and the message authentication tag.

7. The method of claim 1, further comprising:
capturing biometric sensor data using the mobile device;
generating the modified advertising nonce based on one or more predefined bits of the advertising nonce, wherein the value of the modified advertising nonce is different than the advertising nonce and any other the advertising nonce;
generating an other session key by encrypting the modified advertising nonce using the provisioning key; and
encrypting the captured biometric sensor data using the other session key and communicating the encrypted biometric sensor data to the provisioned remote access point.

8. The method of claim 1, further comprising, generating a random number seed based in part on entropy derived by sampling signals from at least one sensor for the mobile device.

9. A mobile device for communicate data over a network, comprising:
a transceiver that is operative to communicate over a network;
a memory that is operative to store at least instructions; and
a processor device that is operative to execute instructions that enable actions, including:
communicating a provisioning key and a provisioning token that corresponds to at least one remote access point for provisioning the at least one remote access point for communication with the mobile device, wherein the provisioning key and the provisioning token that corresponds to a provisioned remote access point are locally stored by the mobile device and the provisioned remote access point;
communicating an advertising nonce and an encrypted advertising nonce to the provisioned remote access point, wherein the provisioned remote access point employs its locally stored provisioning key to decrypt the encrypted advertising nonce and compare the decrypted advertising nonce to the advertising nonce; and
when the provisioned remote access point communicates an equivalent result for the comparison of the advertising nonce and the decrypted advertising nonce, performing further actions, including:

establishing a communication channel with the provisioned remote access point based on the advertising nonce and a session nonce generated by the provisioned remote access point and its corresponding provisioning key;
generating a modified advertising nonce based on flipping one or more predefined bits of the advertising nonce, wherein the value of the modified advertising nonce is different than the advertising nonce and any other advertising nonce, and wherein a test value is generated based on encrypting the modified advertising nonce using the provisioning key;
generating a session key for communicating with the provisioned remote access point based in part on the modified advertising nonce and a message counter, wherein the provisioned remote access point generates a remote message counter;
encrypting the message counter using the session key to generate an encrypted message counter;
generating at least one message packet that includes a message that is encrypted in part by combining the encrypted message counter and the message using an exclusive-or operation, and a message authentication tag; and
communicating the at least one encrypted message packet with the provisioned remote access point.

10. The mobile device of claim 9, wherein the provisioning the at least one remote access point, further includes:
exchanging a temporary key with the at least one remote access point;
generating the provisioning token based on a pseudorandom number; and
generating the provisioning key based on encrypting the provisioning token using a secret key that is stored on the mobile device, wherein the provisioning token is communicated to the at least one remote access point for verification.

11. The mobile device of claim 9, wherein communicating the advertising nonce and the encrypted advertising nonce for the provisioned remote access point, further comprises:
generating a separate advertising nonce based on a pseudorandom number; and
encrypting the separate advertising nonce for the provisioned remote access point using its provisioning key.

12. The mobile device of claim 9, wherein establishing the communication channel with the provisioned remote access point, further comprises:
generating the session nonce based on a pseudorandom number;
generating the modified advertising nonce based on flipping the last bit of the advertising nonce; and
communicating a 3-tuple that includes the session nonce, the test value, and the provisioning token to the access point.

13. The mobile device of claim 9, wherein generating the session key; further comprises:
generating the modified advertising nonce based on flipping the second to last bit of the advertising nonce; and
encrypting the session key based on the modified advertising nonce and the provisioning key.

14. The mobile device of claim 9, wherein generating the at least one message packet, further comprises:
encrypting the message based on the encrypted message counter;

generating the message authentication tag by encrypting a portion of the encrypted message using the session key; and
generating a tuple that includes the encrypted message and the message authentication tag.

15. The mobile device of claim 9, wherein the processor device is operative to perform further actions comprising:
capturing biometric sensor data using the mobile device;
generating the modified advertising nonce based on flipping the third to last bit of the advertising nonce;
generating an other session key by encrypting the modified advertising nonce using the provisioning key; and
encrypting the captured biometric sensor data using the other session key and communicating the encrypted biometric sensor data to the provisioned remote access point.

16. The mobile device of claim 9, wherein the processor device is operative to perform further actions comprising, generating a random number seed based in part on entropy derived by sampling signals from at least one sensor for the mobile device.

17. A system for employing a mobile device to communicate data, comprising:
a mobile device comprising:
a transceiver that is operative to communicate over a network;
a memory that is operative to store at least instructions; and
a processor device that is operative to execute instructions that enable actions, including:
communicating a provisioning key and a provisioning token that corresponds to at least one remote access point for provisioning the at least one remote access point for communication with the mobile device, wherein the provisioning key and the provisioning token that corresponds to a provisioned remote access point are locally stored by the mobile device and the provisioned remote access point;
communicating an advertising nonce and an encrypted advertising nonce to the provisioned remote access point, wherein the provisioned remote access point employs its locally stored provisioning key to decrypt the encrypted advertising nonce and compare the decrypted advertising nonce to the advertising nonce; and
when the provisioned remote access point communicates an equivalent result for the comparison of the advertising nonce and the decrypted advertising nonce, performing further actions, including:
establishing a communication channel with the provisioned remote access point based on the advertising nonce and a session nonce generated by the provisioned remote access point and its corresponding provisioning key;
generating a modified advertising nonce based on flipping one or more predefined bits of the advertising nonce, wherein the value of the modified advertising nonce is different than the advertising nonce and any other advertising nonce, and wherein a test value is generated based on encrypting the modified advertising nonce using the provisioning key;
generating a session key for communicating with the provisioned remote access point based in part on the advertising nonce and a message counter, wherein the provisioned remote access point generates a remote message counter;
encrypting the message counter using the session key to generate an encrypted message counter;
generating at least one message packet that includes a message that is encrypted in part by combining the encrypted message counter and the message using an exclusive-or operation, and a message authentication tag; and
communicating the at least one encrypted message packet with the provisioned remote access point; and
an remote access point computer, comprising:
a transceiver that is operative to communicate over the network;
a memory that is operative to store at least instructions; and
a processor device that is operative to execute instructions that enable actions, including:
receiving the at least one message packet.

18. The system of claim 17, wherein the provisioning the at least one remote access point, further includes:
exchanging a temporary key with the at least one remote access point;
generating the provisioning token based on a pseudorandom number; and
generating the provisioning key based on encrypting the provisioning token using a secret key that is stored on the mobile device, wherein the provisioning token is communicated to the at least one remote access point for verification.

19. The system of claim 17, wherein communicating the advertising nonce and the encrypted advertising nonce for the provisioned remote access point, further comprises:
generating a separate advertising nonce based on a pseudorandom number; and encrypting the separate advertising nonce for the provisioned remote access point using its provisioning key.

20. The system of claim 17, wherein establishing the communication channel with the provisioned remote access point, further comprises:
generating the session nonce based on a pseudorandom number;
generating the modified advertising nonce based on flipping the last bit of the advertising nonce; and
communicating a 3-tuple that includes the session nonce, the test value, and the provisioning token to the access point.

21. The system of claim 17, wherein generating the session key; further comprises:
generating the modified advertising nonce based on flipping the second to last bit of the advertising nonce; and
encrypting the session key based on the modified advertising nonce and the provisioning key.

22. The system of claim 17, wherein generating the at least one message packet, further comprises:
encrypting the message based on the encrypted message counter;
generating the message authentication tag by encrypting a portion of the encrypted message using the session key; and
generating a tuple that includes the encrypted message and the message authentication tag.

23. The system of claim 17, wherein the mobile device's processor device is operative to perform further actions comprising:
capturing biometric sensor data using the mobile device;
generating the modified advertising nonce based on flipping the third to last bit of the advertising nonce;

generating an other session key by encrypting the modified advertising nonce using the provisioning key; and encrypting the captured biometric sensor data using the other session key and communicating the encrypted biometric sensor data to the provisioned remote access point.

24. A processor readable non-transitory storage media that includes instructions for employing a mobile device to communicate data over a network, wherein execution of the instructions by a processor device enables actions, comprising:

communicating a provisioning key and a provisioning token that corresponds to at least one remote access point for provisioning the at least one remote access point for communication with the mobile device, wherein the provisioning key and the provisioning token that corresponds to a provisioned remote access point are locally stored by the mobile device and the provisioned remote access point;

communicating an advertising nonce and an encrypted advertising nonce to the provisioned remote access point, wherein the provisioned remote access point employs its locally stored provisioning key to decrypt the encrypted advertising nonce and compare the decrypted advertising nonce to the advertising nonce; and when the provisioned remote access point communicates an equivalent result for the comparison of the advertising nonce and the decrypted advertising nonce, performing further actions, including:

establishing a communication channel with the provisioned remote access point based on the advertising nonce and a session nonce generated by the provisioned remote access point and its corresponding provisioning key;

generating a modified advertising nonce based on flipping one or more predefined bits of the advertising nonce, wherein the value of the modified advertising nonce is different than the advertising nonce and any other advertising nonce, and wherein a test value is generated based on encrypting the modified advertising nonce using the provisioning key;

generating a session key for communicating with the provisioned remote access point based in part on the modified advertising nonce and a message counter, wherein the provisioned remote access point generates a remote message counter;

encrypting the message counter using the session key to generate an encrypted message counter;

generating at least one message packet that includes a message that is encrypted in part by combining the encrypted message counter and the message using an exclusive-or operation, and a message authentication tag; and communicating the at least one encrypted message packet with the provisioned remote access point.

25. The media of claim 24, wherein the provisioning the at least one remote access point, further includes:

exchanging a temporary key with the at least one remote access point;

generating the provisioning token based on a pseudorandom number; and generating the provisioning key based on encrypting the provisioning token using a secret key that is stored on the mobile device, wherein the provisioning token is communicated to the at least one remote access point for verification.

26. The media of claim 24, wherein communicating the advertising nonce and the encrypted advertising nonce for the provisioned remote access point, further comprises:

generating a separate advertising nonce based on a pseudorandom number; and encrypting the separate advertising nonce for the provisioned remote access point using its provisioning key.

27. The media of claim 24, wherein establishing the communication channel with the provisioned remote access point, further comprises:

generating the session nonce based on a pseudorandom number; and communicating a 3-tuple that includes the session nonce, the test value, and the provisioning token to the access point.

28. The media of claim 24, wherein generating the session key; further comprises:

generating the modified advertising nonce based on flipping the second to last bit of the advertising nonce; and encrypting the session key based on the modified advertising nonce and the provisioning key.

29. The media of claim 24, wherein generating the at least one message packet, further comprises:

encrypting the message based on the encrypted message counter;

generating the message authentication tag by encrypting a portion of the encrypted message using the session key; and generating a tuple that includes the encrypted message and the message authentication tag.

30. The method of claim 1, further comprising:

capturing biometric sensor data using the mobile device;

generating the modified advertising nonce based on flipping the third to last bit of the advertising nonce;

generating an other session key by encrypting the modified advertising nonce using the provisioning key; and encrypting the captured biometric sensor data using the other session key and communicating the encrypted biometric sensor data to the provisioned remote access point.

* * * * *